United States Patent
Budampati et al.

(10) Patent No.: US 7,620,409 B2
(45) Date of Patent: Nov. 17, 2009

(54) WIRELESS COMMUNICATION SYSTEM WITH CHANNEL HOPPING AND REDUNDANT CONNECTIVITY

(75) Inventors: Ramakrishna S. Budampati, Plymouth, MN (US); Patrick S. Gonia, Maplewood, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 691 days.

(21) Appl. No.: 10/870,295

(22) Filed: Jun. 17, 2004

(65) Prior Publication Data

US 2005/0281215 A1    Dec. 22, 2005

(51) Int. Cl.
*H04B 7/212* (2006.01)
*H04J 3/06* (2006.01)

(52) U.S. Cl. .................. 455/502; 370/324; 370/503; 370/507

(58) Field of Classification Search ............. 455/502; 370/324, 503, 507
See application file for complete search history.

(56) References Cited

U.S. PATENT DOCUMENTS

| | | | |
|---|---|---|---|
| 4,614,945 A | 9/1986 | Brunius et al. | |
| 4,843,638 A | 6/1989 | Walters | |
| 5,258,980 A * | 11/1993 | Maebara et al. | 370/347 |
| 5,428,602 A | 6/1995 | Kemppainen | |
| 5,428,637 A | 6/1995 | Oliva, Jr. et al. | |
| 5,438,329 A | 8/1995 | Gastouniotis et al. | |
| 5,511,067 A * | 4/1996 | Miller | 370/335 |
| 5,659,303 A | 8/1997 | Adair, Jr. | |
| 5,822,440 A * | 10/1998 | Oltman et al. | 381/82 |
| 5,898,929 A * | 4/1999 | Haartsen | 455/462 |
| 5,999,124 A * | 12/1999 | Sheynblat | 342/357.09 |
| 6,058,137 A | 5/2000 | Partyka | |
| 6,138,019 A * | 10/2000 | Trompower et al. | 455/436 |
| 6,188,351 B1 * | 2/2001 | Bloebaum | 342/357.15 |
| 6,745,042 B1 * | 6/2004 | Xydis | 455/502 |
| 2002/0011923 A1 | 1/2002 | Cunningham et al. | |
| 2002/0115409 A1 * | 8/2002 | Khayrallah | 455/41 |
| 2003/0043744 A1 * | 3/2003 | Lu et al. | 370/236 |
| 2003/0078062 A1 * | 4/2003 | Burr | 455/502 |
| 2003/0185170 A1 * | 10/2003 | Allen et al. | 370/329 |

(Continued)

FOREIGN PATENT DOCUMENTS

EP      0893931      1/1999

*Primary Examiner*—Nick Corsaro
*Assistant Examiner*—Joel Ajayi
(74) *Attorney, Agent, or Firm*—Cropmton, Seager & Tufte, LLC

(57) ABSTRACT

A wireless system having an infrastructure node and several leaf nodes in a non-redundant version or having at least two infrastructure nodes and several leaf nodes in a redundant version. Leaf nodes may individually seek out timing information in order to be in synch with an infrastructure node. Upon receipt of synch information from an infrastructure node, the respective leaf node may send data to the infrastructure node. In the case of a redundant system, primary and secondary nodes may be selected from a list of infrastructure nodes. Communications between an infrastructure node and a leaf node may occur on one of a number of channels, and the channel may be changed for communications between the nodes. In the case of a redundant system, a single transmission from the leaf node is received simultaneously by the redundant infrastructure nodes.

87 Claims, 16 Drawing Sheets

U.S. PATENT DOCUMENTS

2003/0219037 A1* 11/2003 Toskala et al. .............. 370/496
2004/0185899 A1* 9/2004 Hayem et al. ............ 455/552.1
2005/0073991 A1* 4/2005 Roberts et al. .............. 370/350

* cited by examiner

WIRELESS COMMUNICATION SYSTEM WITH CHANNEL HOPPING AND REDUNDANT CONNECTIVITY

BACKGROUND

The invention relates to wireless communications systems. Particularly, it relates to communications between at least two entities with transmissions on different channels. More particularly, the invention additionally relates to such systems having some redundancy.

SUMMARY

The present invention may involve two sets of nodes—infrastructure nodes and leaf nodes. Wireless communications between these sets of nodes may occur. Such communications may include the request and receipt of timing information. Further, they may also include the sending of data. There may be some redundancy in place for the receipt of data communications. The transmissions and reception of them may occur on various channels that may be changed from one communication to another.

DESCRIPTION

Figure 1B:
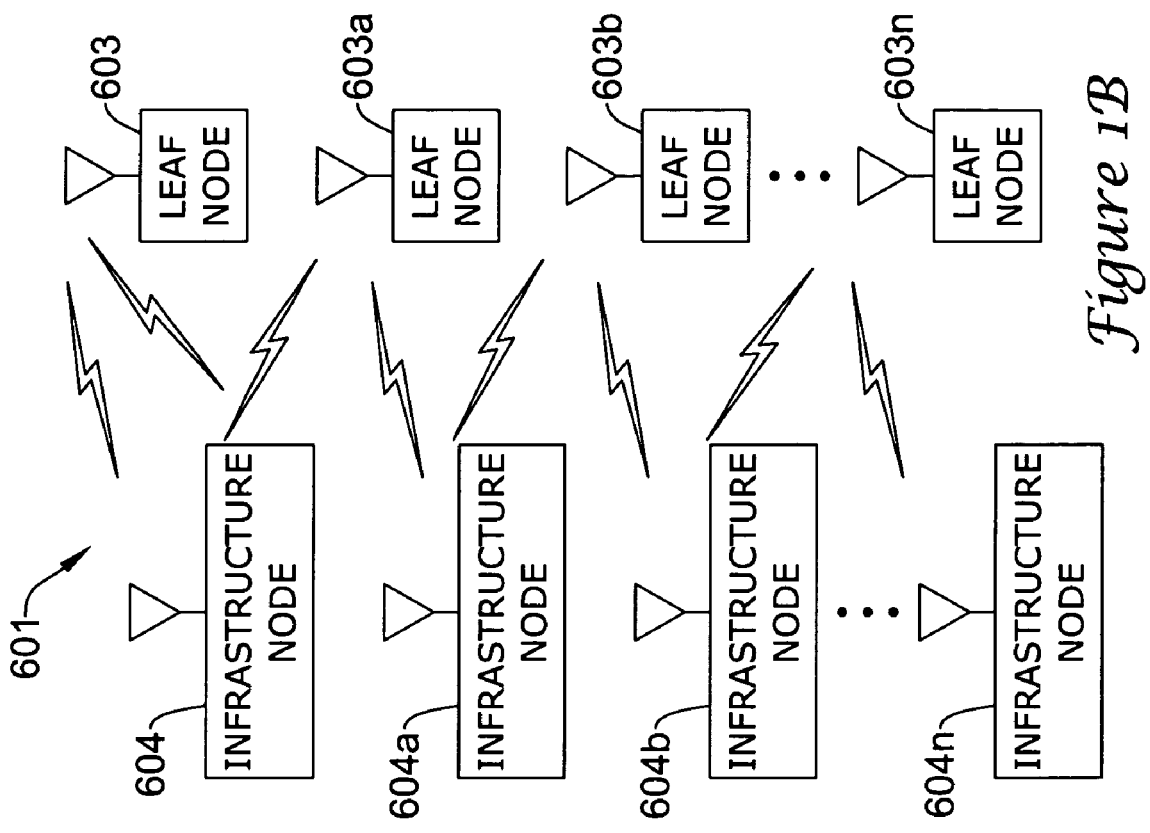
FIGS. 1a and 1b are diagrams of non-redundant and redundant wireless systems, respectively.
Figure 1A:
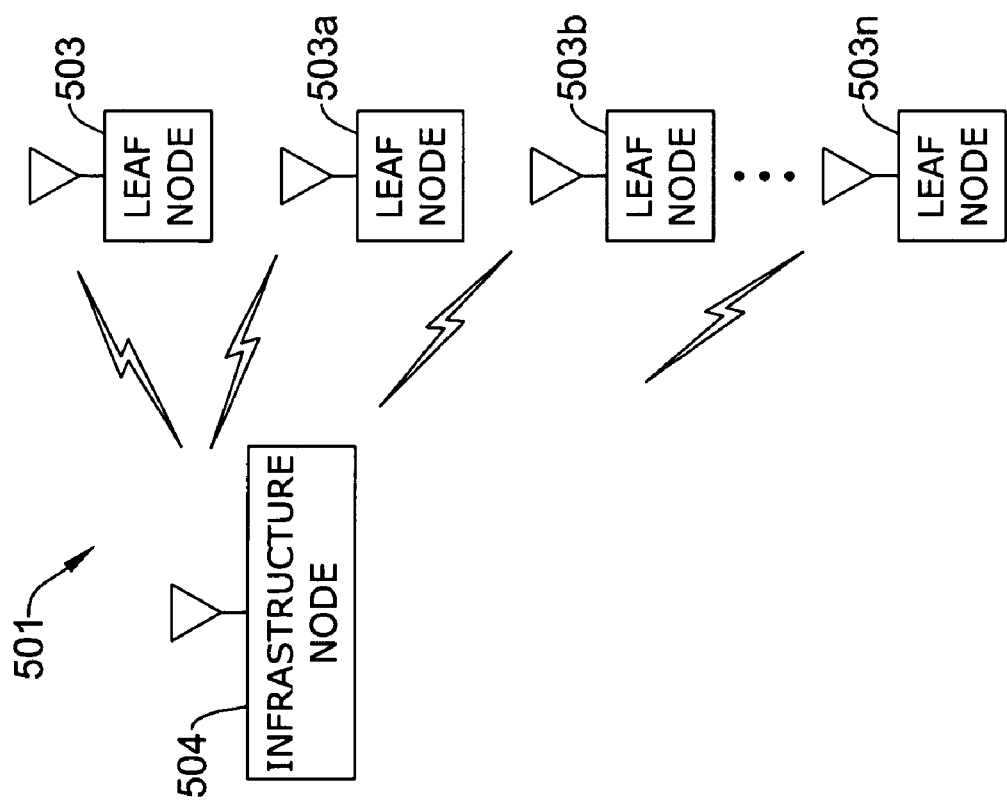

FIG. 1a shows a non-redundant wireless system 501 having a number of leaf nodes 503, 503a, 503b, . . . , 503n interacting with an infrastructure node 504. "503" may designate a specific node or be a generic designation. FIG. 1b shows a redundant wireless system 601 having a number of leaf nodes 603, 603a, 603b, . . . , 603n interacting with several infrastructure nodes 604, 604a, 604b, . . . , 603n. "603" and "604" may designate a specific node or be a generic designation. "n" may be any designated number of nodes. Communications among the different nodes may involve a changing of channels for transmission and reception. As an instance, the communications may involve frequency hopping.

An illustrative example of a non-redundant system 501 is first described along with state diagrams. Then an illustrative example of a redundant system 601 is described along with state diagrams. Further description of the non-redundant system 501 is provided with a timing diagram. Similarly, more description of the redundant system is provided with timing diagrams.

Figure 2:
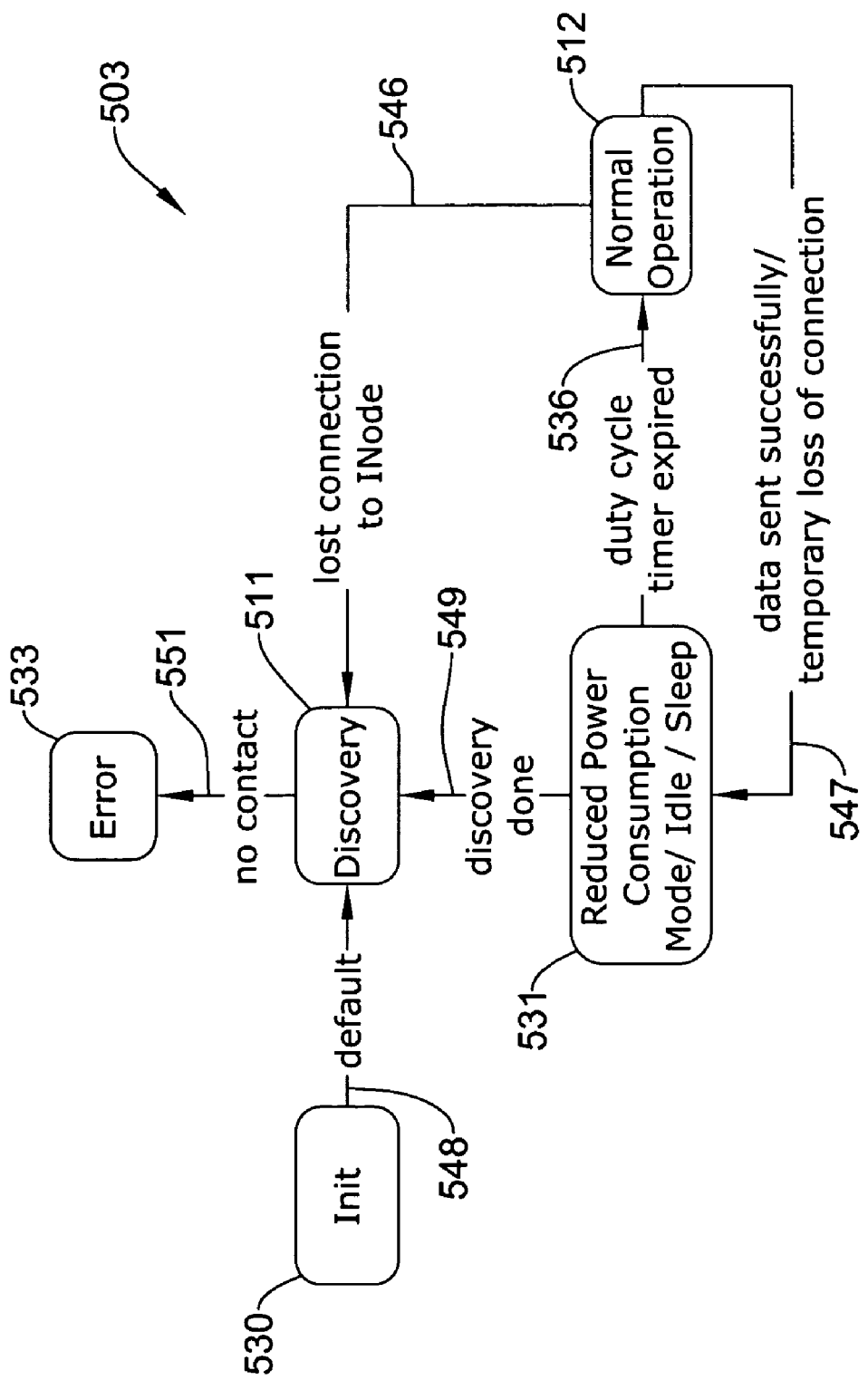
FIGS. 2-4 are state diagrams of a leaf node in a non-redundant wireless system.

FIG. 2 shows a state diagram for leaf node 503. The default transition 548 of leaf node 503 may be from an initiation state 530 to a discovery state 511. During the discovery state, the leaf node 503 attempts to establish communication and synchronize the clock with infrastructure node 504. If there is no contact with infrastructure node 504, then an error state 533 may be entered into by the leaf node 503 through transition 551.

When discovery 511 of leaf node 503 is done, a transition 549 may occur to an idle/sleep or reduced power consumption state 531. (One may note FIG. 12 relative to the present portion of the description.) When the duty cycle time of the leaf node 503 has expired, then leaf node 503 may have a transition 536 to normal operation state 512. If data 532 is successfully sent to the infrastructure node 504 or if there is a temporary loss of connection, then leaf node 503 may go back to the idle/sleep mode 531 upon a transition 547. If an established connection to the infrastructure node 504 is lost, then leaf node 503 may return to the discovery state 511 upon a transition 546.

Figure 3:
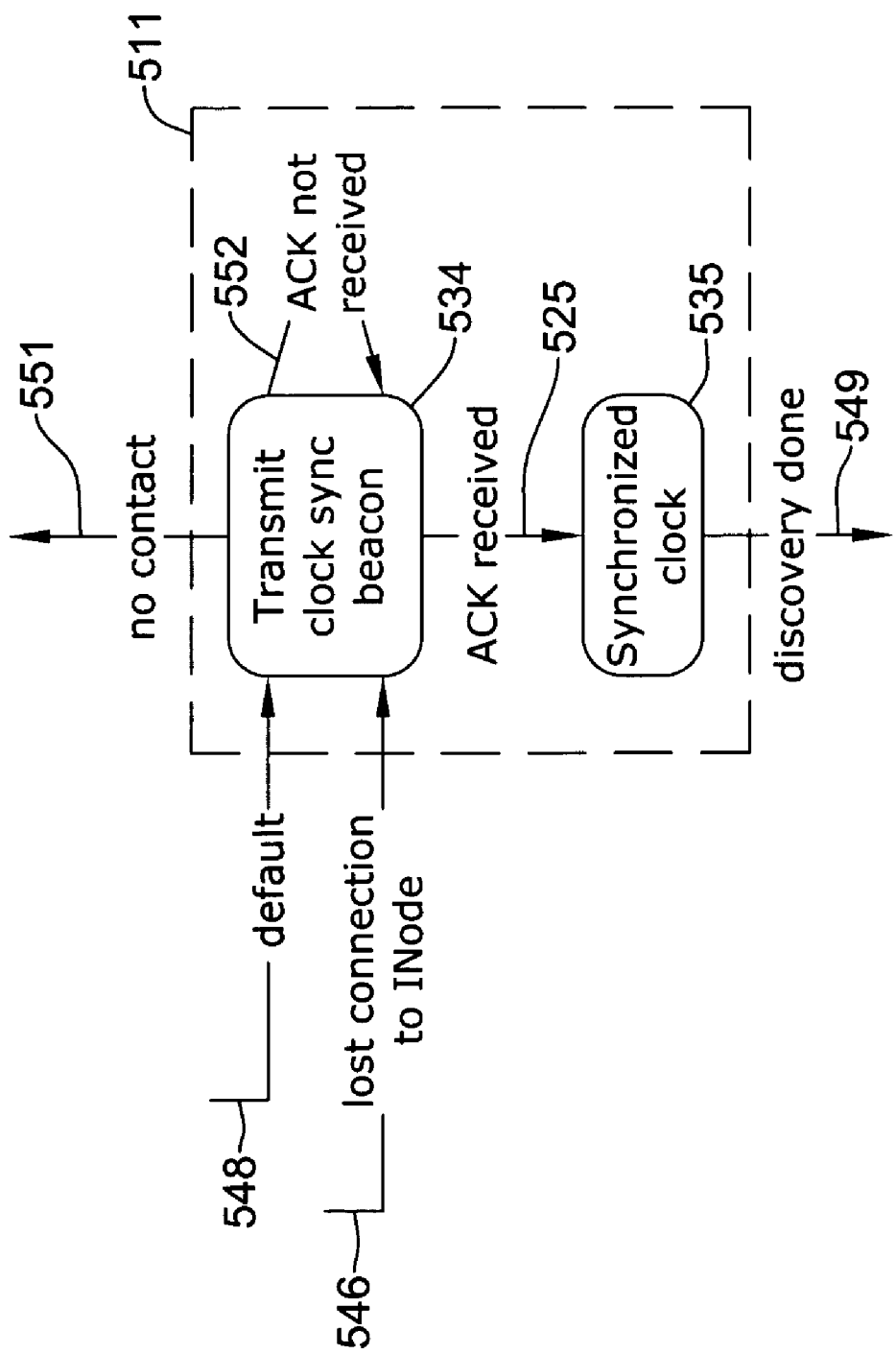

FIG. 3 shows a state diagram of the leaf node discovery 511. The default transition 548 from the initial state 530 or a lost connection to infrastructure node 504 transition 546, during the normal operation state 512, may cause node 503 to go into a transmit clock sync beacon state 534. There are times 522 between transmissions 521 (note FIG. 12) upon which leaf node 503 may receive an acknowledgement or reply 525 from an infrastructure node 504. Time duration 522 may be the gap of time between successive sync beacon transmissions 521. If an acknowledgement or reply 525 is not received, then a clock sync beacon 521 may be transmitted again on different channels for a number of times or for a given period of time until an acknowledgement or reply 525 is received. If no acknowledgement or reply 525 is received, as indicated by a transition 552, then a no contact transition 551 may result in an error state 533. If an acknowledgement 525 is received, then the clock of leaf node 503 may be synchronized to a system clock of the infrastructure node 504. This is a synchronize clock state 535. When the synchronize clock state 535 is achieved, then the discovery state may be completed as indicated by a transition 549, and leaf node 503 may enter the idle/sleep state 531. When the duty cycle timer of state 531 is expired, then leaf node 503 may proceed to the normal operation state 512 through transition 536 (FIG. 2).

Figure 4:
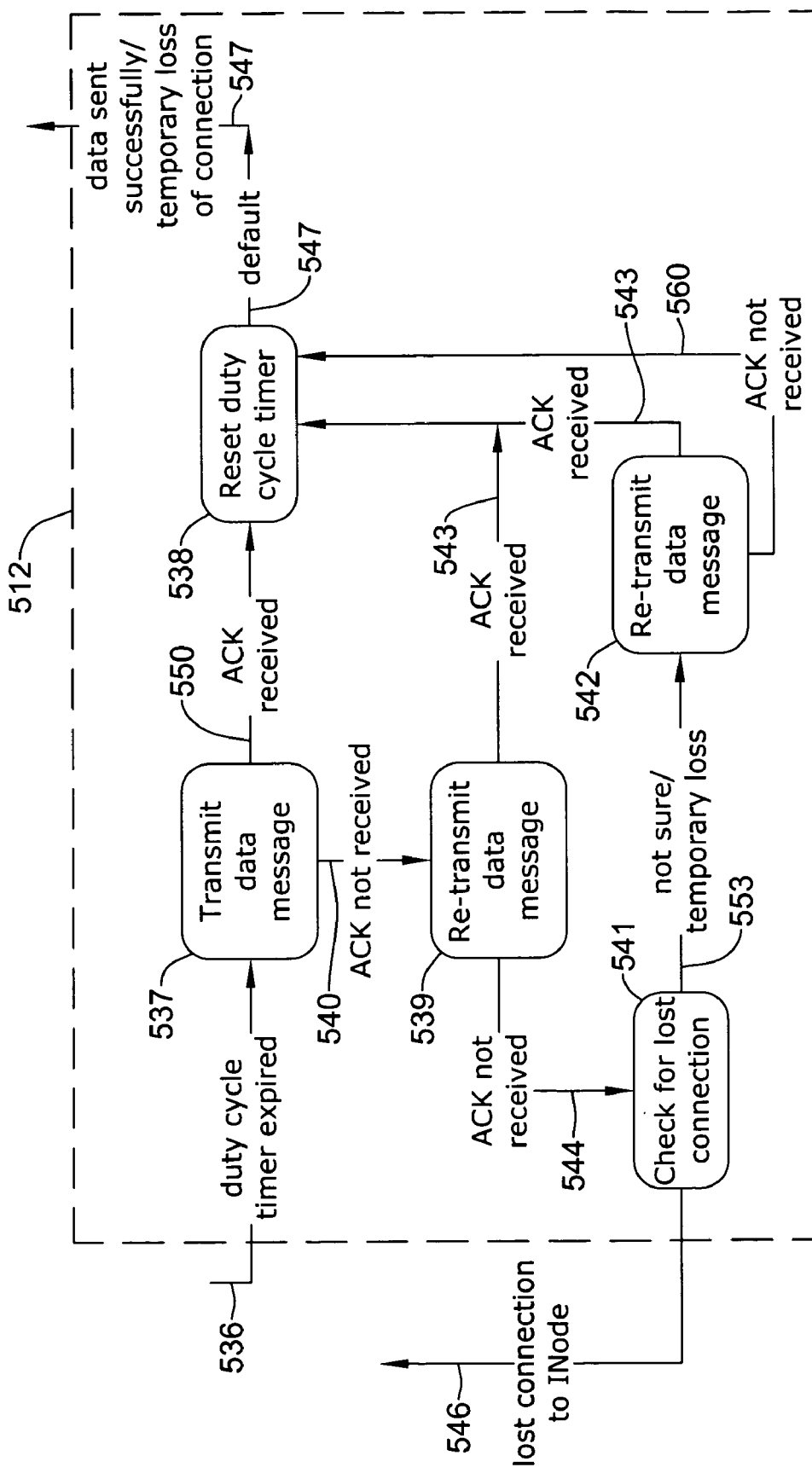
Figure 12:
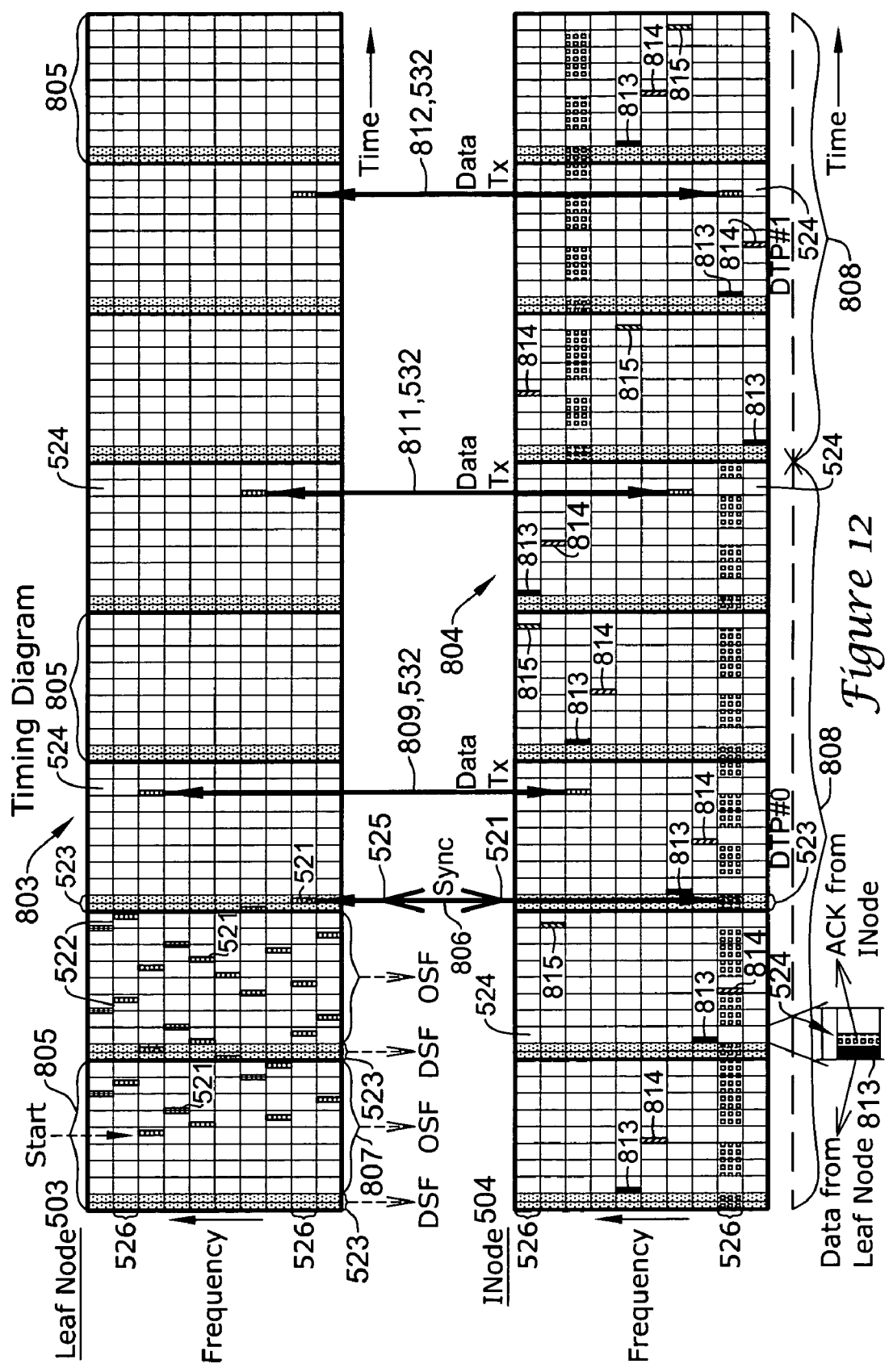
FIG. 12 is a timing diagram of a non-redundant wireless system.

FIG. 4 reveals the internal states of the normal operation state 512. State 512 may be triggered by a duty cycle timer expiration transition 536 which goes to a transmit data 532 message state 537. The number 532 may be a designation of data in general and may include, for examples, data 808, 811 and 812 (FIG. 12). If data 532 is successfully received by the infrastructure node 504, it replies back with an acknowledgement (ACK). If the leaf node 503 receives this ACK, then an ACK received transition 550 may reset the duty cycle timer at state 538. If an acknowledgement signal is not received relative to the sent data 532, then a re-transmit data 532 message state 539 may arise due to transition 540 and the data 532 message may be re-sent. If an ACK signal is received from the infrastructure node 504, then the reset duty cycle timer state 538 may be attained by transition 543. If an ACK signal is not received as indicated by a transition 544, after a certain number of re-transmits or period of time, then a check for lost connection 541 state may be attained through transition 546. At state 541, a not sure/temporary loss transition 553 may cause a re-transmit data message state 542, or a lost connection to infrastructure node 504 transition 546 may lead to re-initiating discovery state 511.

If re-transmission of data 532 is successful in state 542 and an ACK received transition 543 occurs, then the reset duty cycle timer state 538 may be attained. If ACK signal is not received, then a transition 560 may occur to the reset duty cycle timer state 538.

Figure 5:
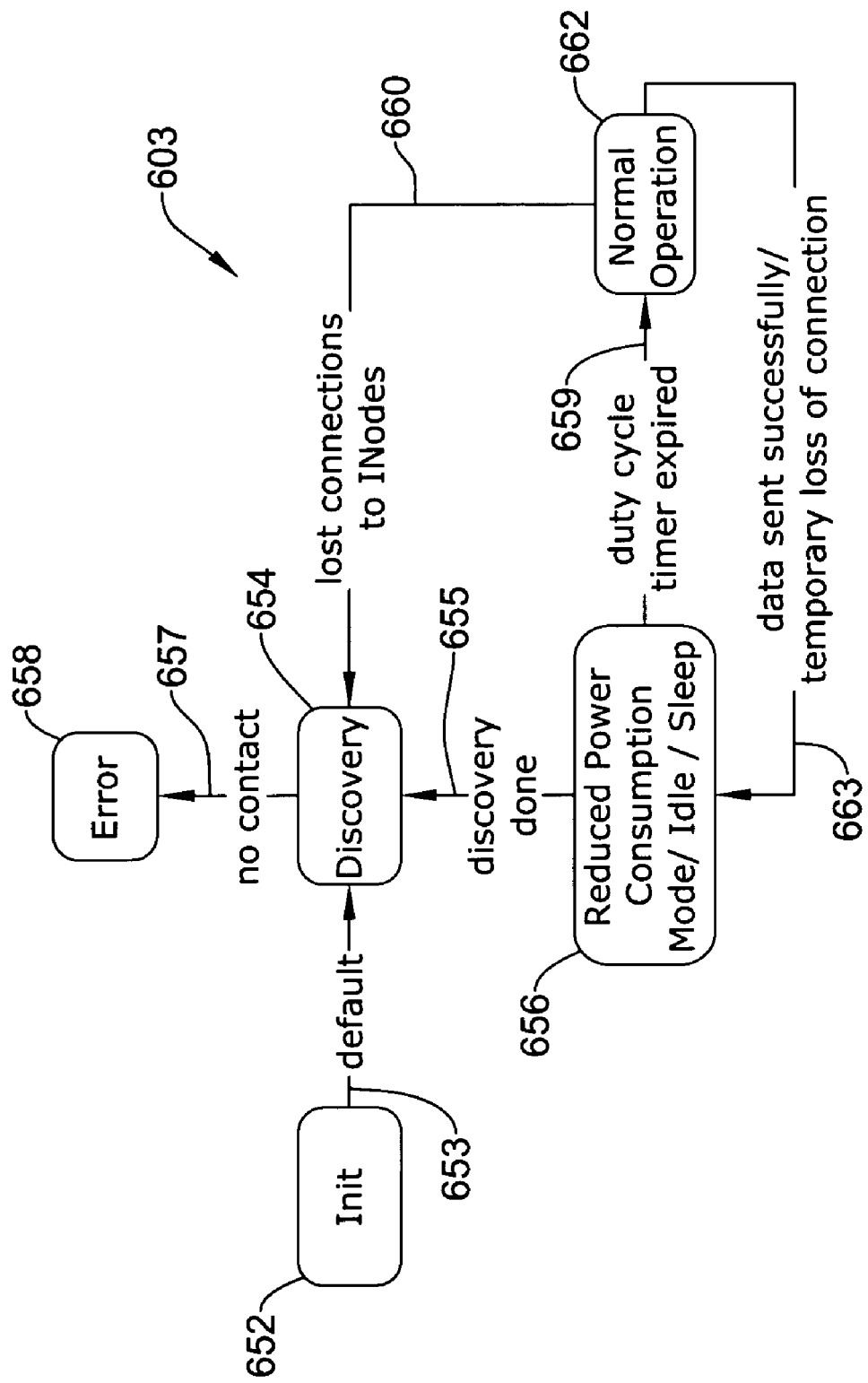
FIGS. 5-7 are state diagrams of a redundant wireless system.

FIG. 5 is a state diagram of a leaf node 603 that communicates with two or more infrastructure nodes 604a, 604b, . . . 604n. An initiating state 652 may default with a transition 653 to a discovery state 654 which may proceed to seek contact with the infrastructure nodes in the neighborhood. The leaf node may seek to contact all of the infrastructure nodes in the neighborhood in order to prepare a list of preferred infrastructure nodes (this is described below). If no contact is made, a transition 657 may lead the leaf node 603 to an error state 658. However, upon contact with the infrastructure nodes in the neighborhood, a transition 655 indicating discovery done may put leaf node 603 into an idle/sleep or reduced power consumption state 656. When a duty cycle timer has expired with a transition 659, the leaf node 603 may enter a state 662 of normal operation. From this state of normal operation 662, leaf node 603 may return to an idle/sleep state 656 upon the data sent successfully/temporary loss of connection occurrence 663, or leaf node 603 may return to the discovery state 654 through the transition 660 if connections to the infrastructure nodes are lost.

Figure 6:
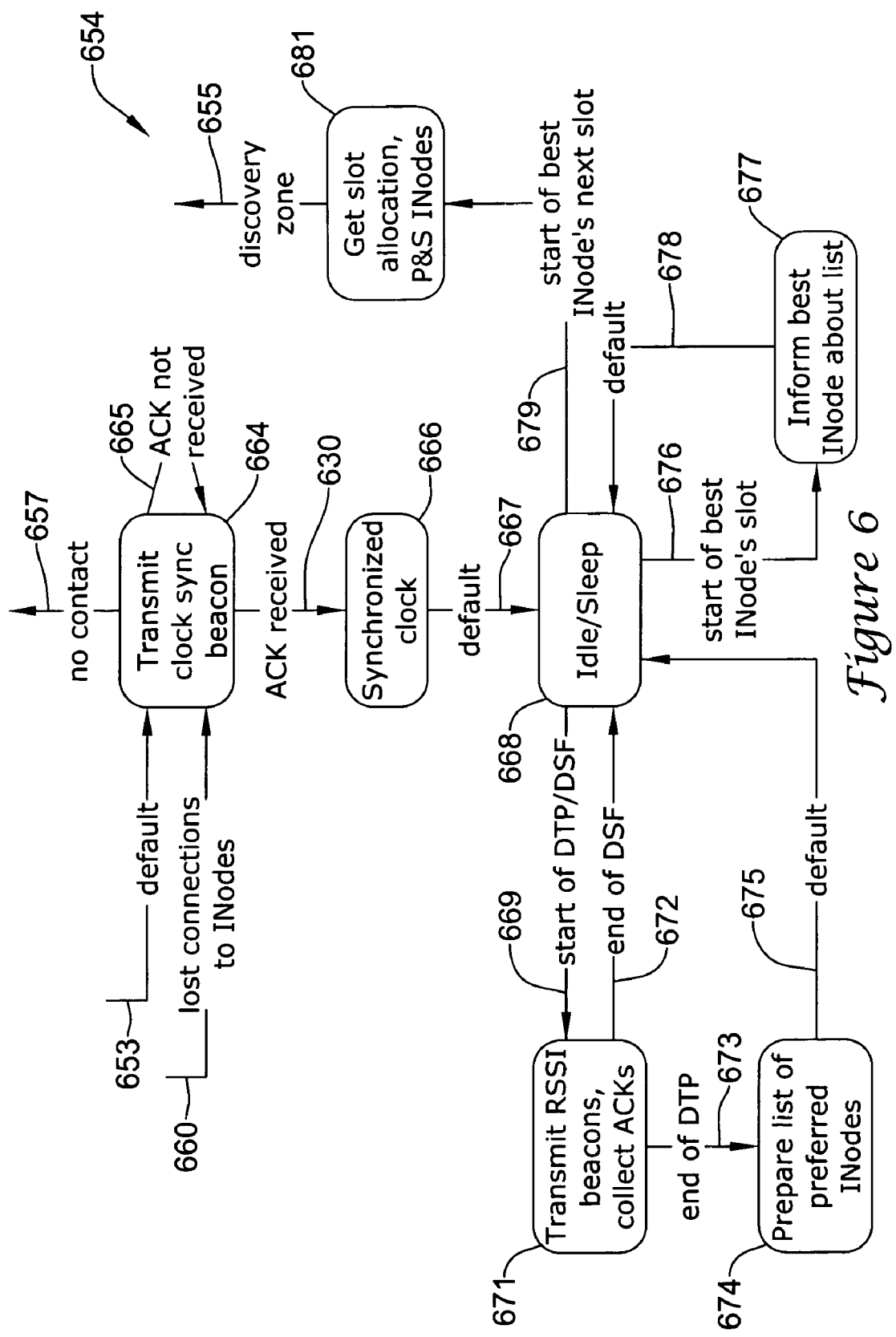
Figure 16:
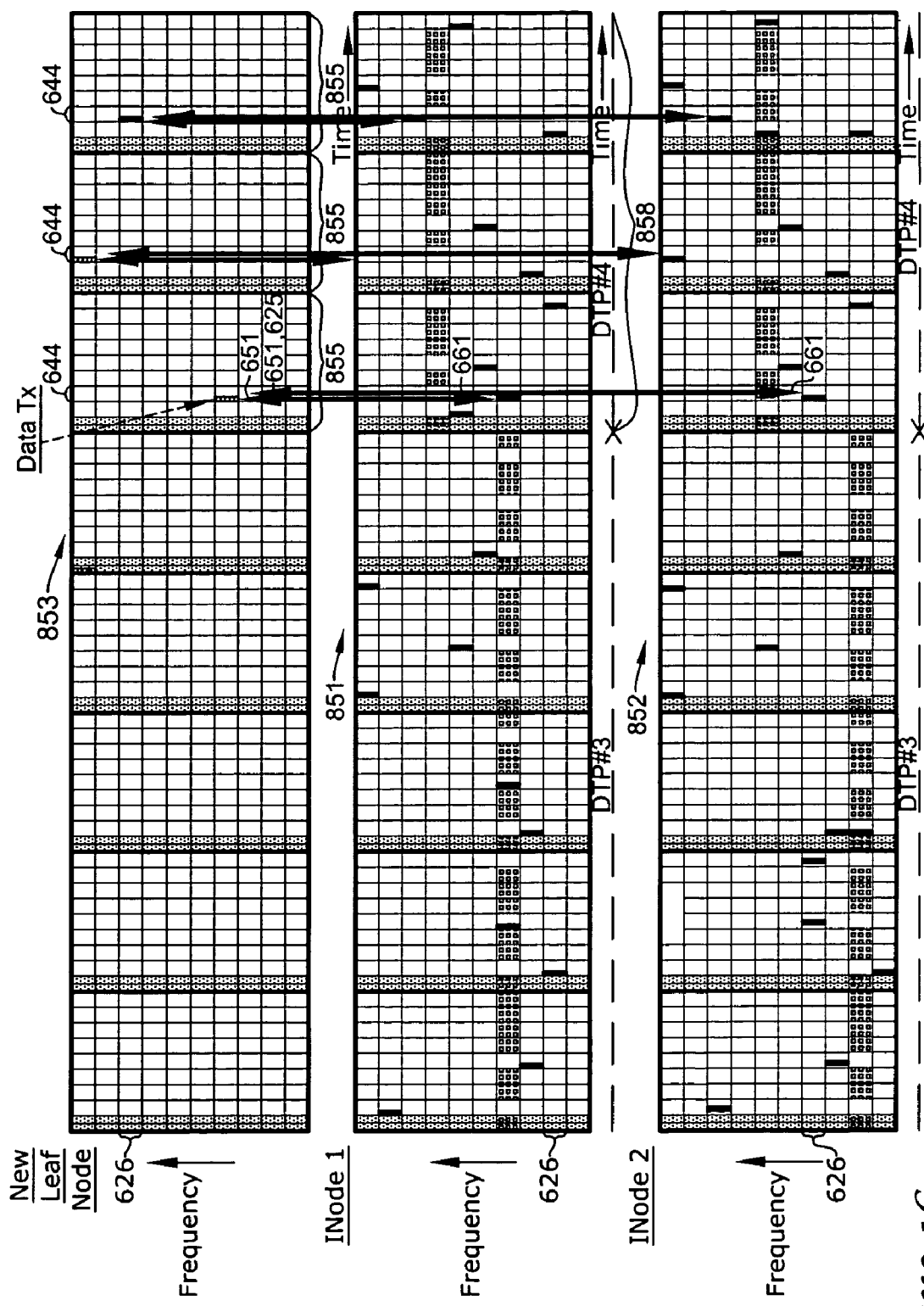

FIG. 6 shows a state diagram of the discovery state 654. A default transition 653 of initialization state 652 may cause a state 664 involving a transmission of clock sync beacons 621 for sync or timing information from neighboring infrastructure nodes 604, 604a, 604b, . . . 604n. If no acknowledgement (665) is received by leaf node 603 from the neighboring infrastructure nodes even after repeated transmissions of clock sync beacons 621, then there may be a transition 657 to error state 658. However, receipt of an acknowledgement 630 may lead to a synchronize clock state 666. The acknowledgment contains information about the system clock. When the clock of the leaf node 603 is synchronized with a system clock, then a default transition 667 may put leaf node 603 into an idle/sleep state 668. A start 669 of a DTP or a DSF (described below while discussing the timing diagrams in FIGS. 13-16) may put leaf node 603 in a state 671 of transmitting RSSI beacons 631 and collecting acknowledgements with link quality information 635. The acknowledgement from each infrastructure node also includes a temporary time slot allocation for this leaf node 603. The leaf node 603 also calculates the link quality information for the received acknowledgments. At the end of a DSF, a transition 672 may return leaf node to the idle/sleep state 668. After the expiration of an OSF, another DSF may be started by a transition 669 to return leaf node 603 to the state 671 of transmitting RSSI beacons 631 and collecting acknowledgments with link quality information 635. Then the end of the DSF 672 may return leaf node 603 to the idle/sleep state 668. This cyclic procedure may repeat itself until the end of the DTP or until another predefined condition is reached with a transition 673 that may cause leaf node 603 to enter a state 674 and prepare a list of preferred infrastructure nodes. This list may be based on the obtained link quality information 635 and the calculated link quality information. Once the list is completed relative to the received information 635 and the calculated information, a default transition 675 may return leaf node to an idle/sleep state 668 for a period of time until the beginning of the temporary time slot 634 (FIG. 14) allocated by the best infrastructure node in the list of preferred infrastructure nodes. Then, upon transition 676, at a start of the temporary time slot allocation 634 (FIG. 14) provided by the best infrastructure node in the list of preferred infrastructure nodes, the best infrastructure node 604a, for example, may be informed by leaf node 603 about the list of preferred infrastructure nodes at state 677. Upon completion of state 677, a default transition 678 may put leaf node 603 into the idle/sleep state 668. At the start of the best infrastructure node's next temporary time slot allocation 634 at transition 679, may get a regular slot allocation 644 (FIG. 16) and a determination of primary and secondary infrastructure nodes 604a and 604b at state 681. Upon completion of state 681, a discovery done transition 655 leads to state 656 which may put leaf node 603 into an idle/sleep or reduced power consumption mode.

Figure 7:
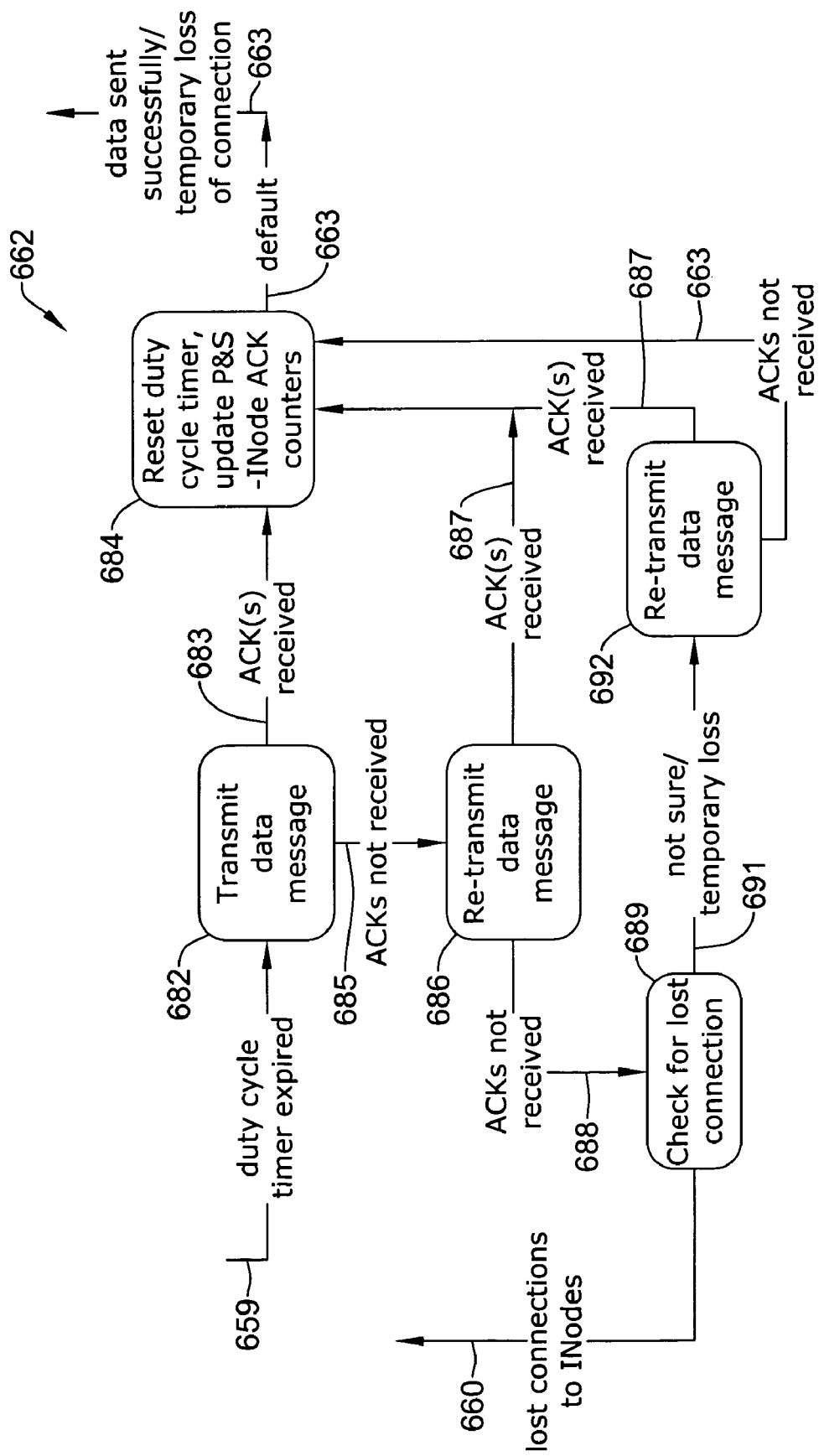

FIG. 7 shows a state diagram of the leaf node normal operation 662. When the duty cycle timer expiration transition 659 occurs, a transmit data state 682 is entered and the leaf node 603 may send data that is received simultaneously by the primary and secondary infrastructure nodes 604a and 604b. If the leaf node 603 receives an acknowledgement from at least one infrastructure node, then the leaf node 603 may transition (683) to a state 684 where it resets the duty cycle timer and updates the primary and secondary infrastructure nodes acknowledgement counters appropriately. If there is no receipt (685) of acknowledgement of the data message from at least one infrastructure node, then the leaf node 603 may enter a state 686 to retransmit the data message. After this retransmission, if there is receipt of acknowledgement from at least one infrastructure node, then leaf node 603 may reset the duty cycle timer and update the primary (604a) and secondary (604b) infrastructure node acknowledgement counters at state 684. If at state 686, acknowledgements from both the infrastructure nodes 604a and 604b are not received, then the leaf node 603 may transition (688) to a state 689 of checking for lost connections. In state 689, if the leaf node 603 is not sure of a permanent loss of connections, transition 691 may occur. In state 689, if the leaf node 603 determines a permanent loss of connections, transition 660 may occur. If transition 660 occurs, then the discovery state 654 may be initialized to re-establish connections to the infrastructure nodes. If transition 691 occurs, then a state 692 of retransmitting the data message may occur. If it is a successful transmission, then an acknowledgement(s) received transition 687 may lead to state 684. If it is not a successful transmission, then a transition 663 due to no acknowledgement received may return leaf node 603 to state 684. After resetting the duty cycle timer and updating the acknowledgment counters appropriately, default transition 663 may return leaf node 603 to the idle/sleep state 656.

Figure 8:
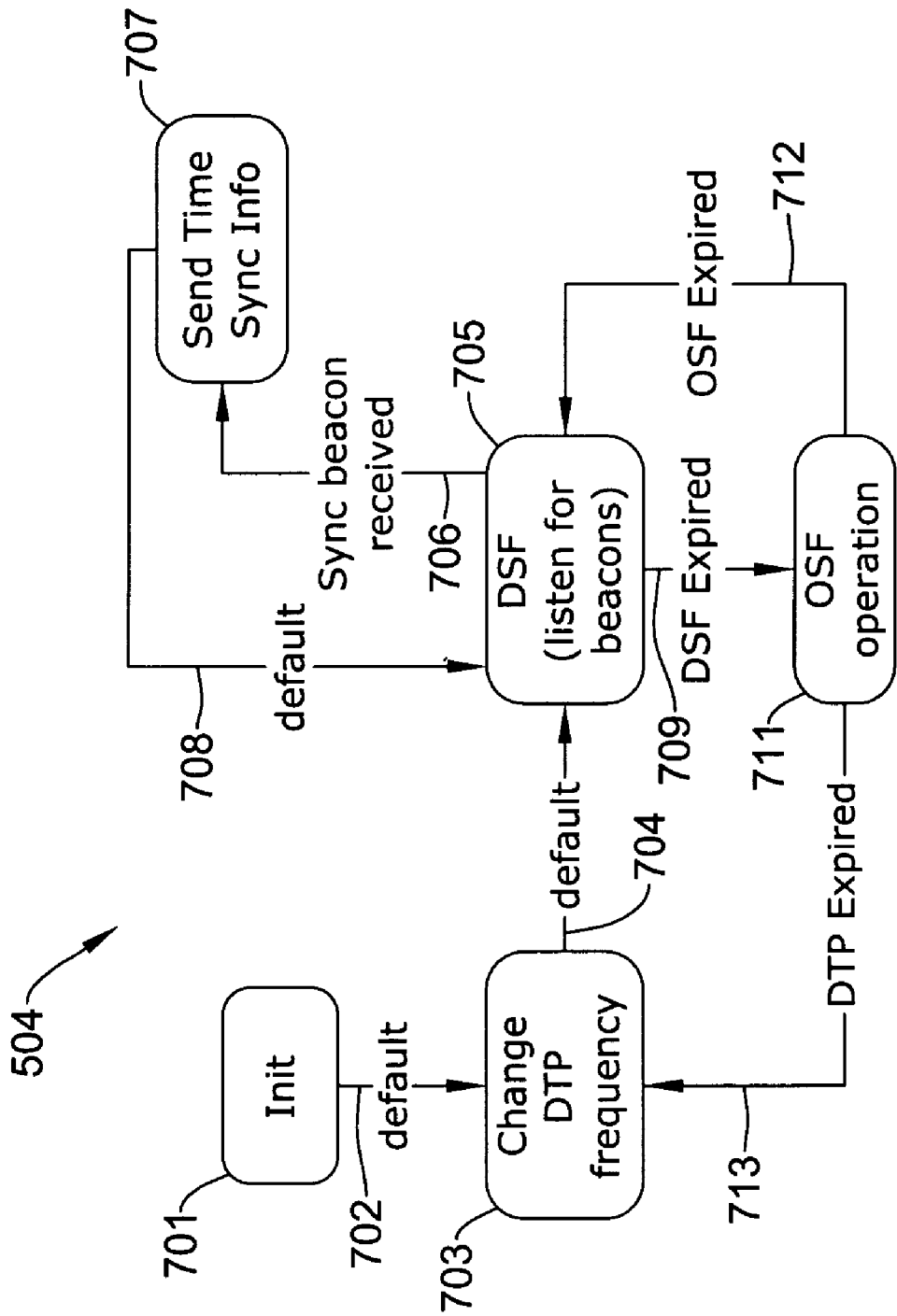
FIGS. 8-9 are state diagrams of an infrastructure node in a non-redundant wireless system.

FIG. 8 reveals an infrastructure node state diagram for a non-redundant case of a leaf node 503 and one infrastructure node 504 (as shown in FIG. 1a). An initial state 701 may transition (702) to a change DTP frequency (described below while discussing a timing diagram in FIG. 12) state 703 which in turn may transition (704) to a DSF (illustrated in FIG. 12) state 705 listening for beacons 521 (illustrated in FIG. 12) from a leaf node 503. If a sync beacon 521 is received by infrastructure node 504 from leaf node 503, then a transition 706 due to receipt of sync beacon 521 may initialize a state 707 to send time sync information 525 to leaf node 503. Upon an occurrence of state 707, a default transition 708 may return the infrastructure node 504 to the DSF state 705 of listening for beacons 521. If the DSF has expired, then a transition 709 may lead to an OSF operation state 711. The alternatives at state 711 may include a transition 712, because of an expired OSF, to DSF state 705 of listening for beacons 521 or a transition 713 of an expired DTP to a state 703 of changing the DTP frequency.

Figure 9:
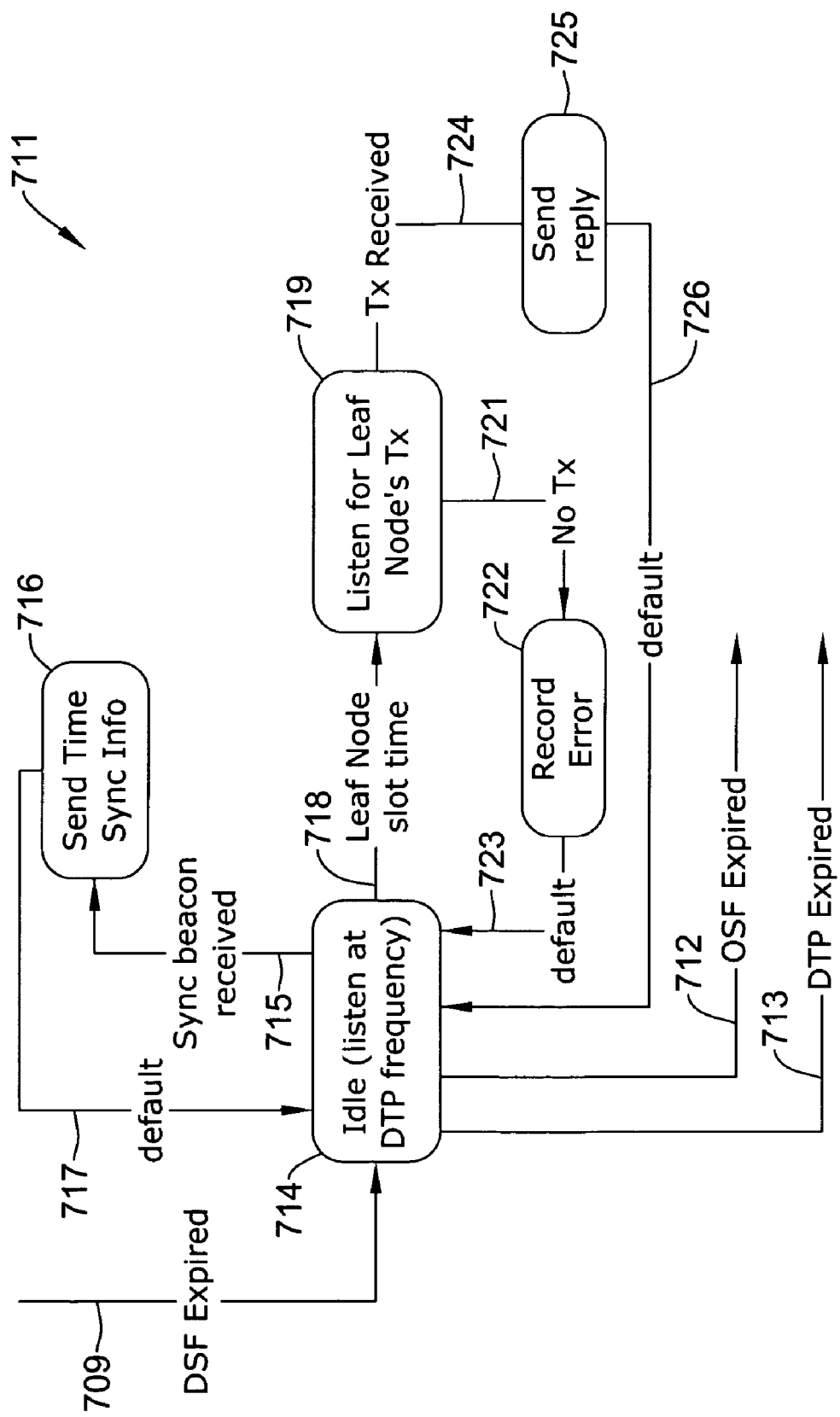

FIG. 9 is a state diagram of the OSF operation state 711 (in FIG. 8) of an infrastructure node 504 in a non-redundant case. Transition 709 from DSF state 705 that the DSF has expired may go to an idle state 714 at which the infrastructure node 504 may listen at a DTP frequency for beacons 521. The infrastructure node may receive a sync beacon and transition (715) to a state 716 which may then send time sync information 525 to leaf node 503. Then infrastructure node 504 may go into an idle state 714 by a default transition 717 from state 716. When a leaf node slot time 524 occurs, the infrastructure node 504 may transition (718) to listen for the leaf node's transmission in state 719. If infrastructure node 504 receives no transmission of data 532 from leaf node 503, then a no transmission transition 721 may go from state 719 to a record error state 722 which in turn may have a default transition 723 to the idle state 714. If a transmission is received, then a transition 724 may put infrastructure node 504 into a send reply state 725. After sending a reply, infrastructure node 504 may have a default transition 726 to the idle state 714. From the idle state 714, infrastructure node 504 may again do a transition 718 to listen for a leaf node's transmission in state 719 (this may be the same leaf node or a different leaf node). If the OSF or DTP expires, it may return to the DSF state 705 or the change DTP frequency state 703, respectively, via transition 712 or 713.

Figure 10:
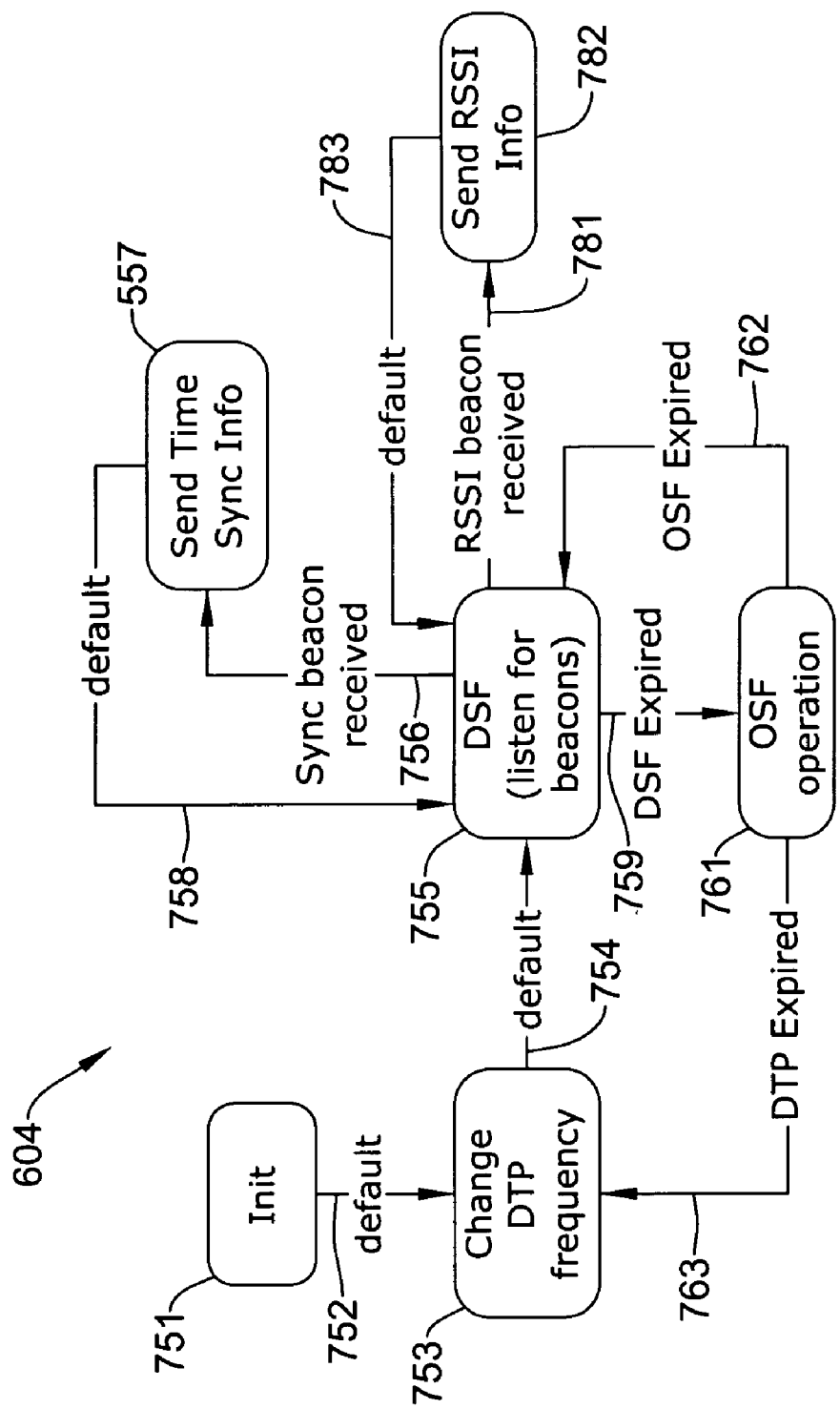
FIGS. 10-11 are state diagrams of an infrastructure node in a redundant wireless system.

FIG. 10 reveals an infrastructure node state diagram for a redundant case including a leaf node 603 and several infrastructure nodes of the nodes 604, 604a, 604b, . . . 604n (as shown in FIG. 1b). An initial state 751 may transition (752) to a change DTP frequency (described below while discussing timing diagram in FIG. 12) state 753 which in turn may indicate a default transition 754 to a DSF state 755 listening for beacons 621 from a leaf node 603. In the DSF state 755, the infrastructure node may listen for beacons 621 from leaf node 603. Upon receipt of a sync beacon 621 as indicated at transition 756, infrastructure node may in state 557 send time sync information 625 to leaf node 603. Infrastructure node may default 758 to the DSF state to once again listen for beacons. In this state, the infrastructure node may receive a beacon 631 from a leaf node asking for RSSI or link quality information 635. The latter leaf node could be another one from a group of leaf nodes 603, 603a, 603b, . . . 603n. Upon receipt of a RSSI beacon 631, infrastructure node may transition (781) to a state 782 where RSSI information 635 is sent to leaf node 603. After sending information 635, infrastructure node may default with a transition 783 to DSF state 755. If the DSF expires, then infrastructure node along a transition 759 may enter an OSF operation state 761. When the OSF expires as indicated by a transition 762, infrastructure node may return to the DSF state 755 to listen for beacons 621 or 631 from a leaf node 603. When the DTP expires as indicated by transition 763 from the OSF operation state 761, infrastructure node may return to the change DTP frequency state 753 which in turn may default with the transition 754 to the DSF state 755.

Figure 11:
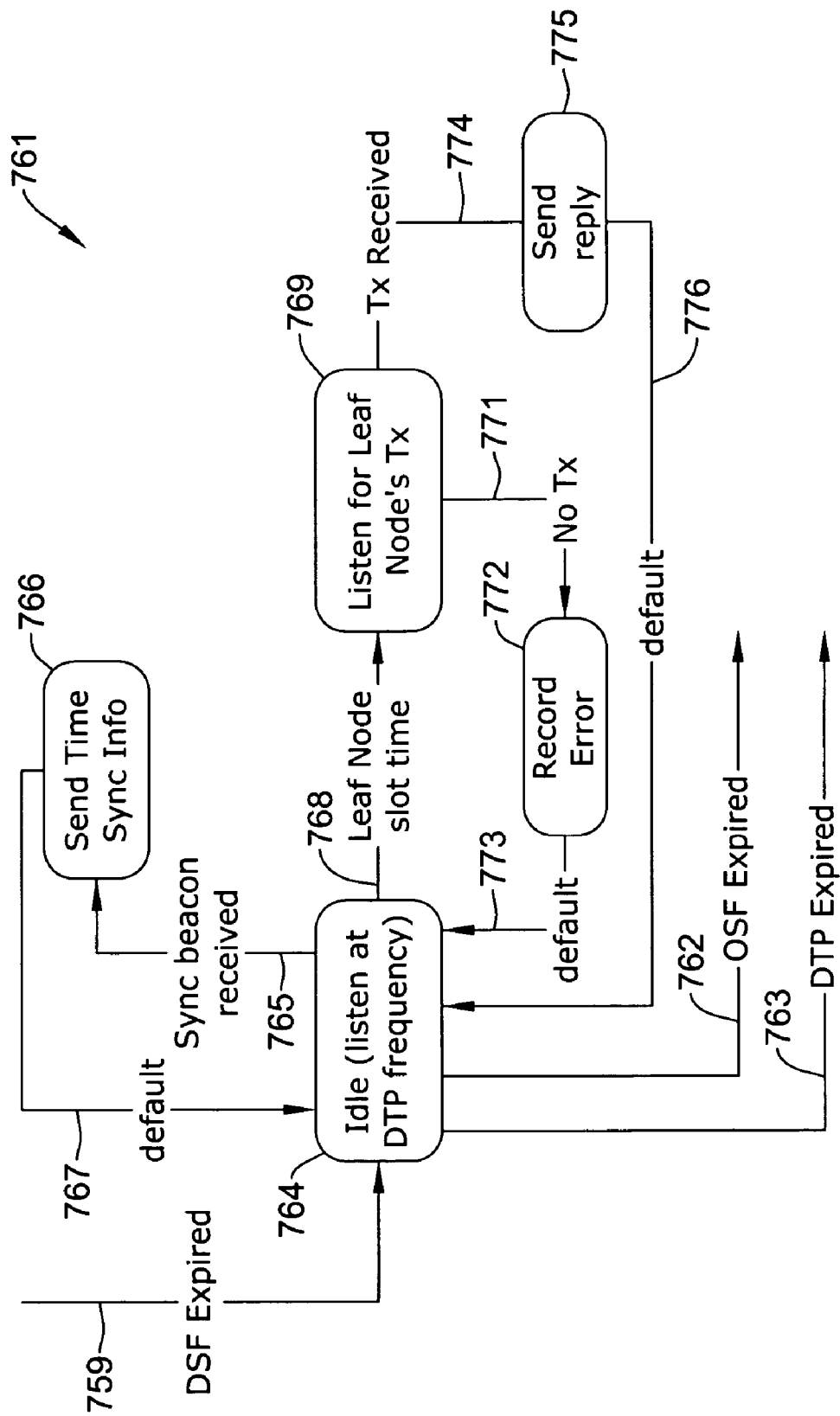

FIG. 11 is a state diagram of the OSF operation state 761 (in FIG. 10) of an infrastructure node in a redundant case. The transition 759 from DSF state 755 because the DSF has expired may cause the infrastructure node to go to an idle state 764 at which the infrastructure node listens at a DTP frequency for beacons. It may receive a sync beacon according to a transition 765 to a state 766 of infrastructure node which may then send time sync information 625 to leaf node 603. Then, infrastructure node may return to an idle state 764 through a default transition 767. When a leaf node slot time 624 occurs, the infrastructure node may transition (768) to listen for the leaf node's transmission in state 769. If infrastructure node receives no transmission of data 632 from leaf node 603, then a transition (771) may occur from state 769 to a record error state 772 which in turn may have a default transition 773 to the idle state 764. If a transmission is received, then a transition 774 may put infrastructure node into a send reply state 775. After sending a reply, the infrastructure node may transition (776) to the idle state 764. From the idle state 764, infrastructure node may transition (768) at the leaf node slot time (which may be the same or different leaf node's slot) to again listen for a leaf node's transmission in state 769, or if the OSF or DTP expires, it may return to the DSF state 755 or the change of DTP frequency state 753, respectively, via transition 762 or 763. The leaf node listened for, may or may not be the same as the previous one. The leaf node may be one of nodes 603, 603a, 603b, . . . 603n.

FIG. 12 reveals a timing diagram for the non-redundant case involving a leaf node 503 and an infrastructure node 504. The leaf node 503 timing is shown in diagram portion 803 and the infrastructure node 504 is shown in diagram portion 804. The diagrams show frequency on y-axis and time on x-axis. Time distances 805 may be regarded as frames. Within each from 805 is a discovery sub-frame (DSF) 523 and an operation sub-frame (OSF) 807. A certain number of frames together may result in a discovery time period (DTP) 808. The number of frames may be determined by the design of the specific system. For illustrative purposes, a DTP is assumed to contain a total of 8 frames, and the last five frames 805 of DTP#1 and the first three frames of DTP#2 are shown in FIG. 12. There may be more or less than the illustrated number of frames 805 per DTP 808. The timing frames and sub-frames, and frequency scales are the same for diagram portions 803 and 804. Various channels 526 are marked along the frequency axis and they may be adjacent to one another. The numerical term 526 may designate one or more different channels.

The DSF 523 is a period when the infrastructure node 504 listens for a transmission 521 from a leaf node 503. Leaf node 503 may repeatedly send transmissions 521 on various channels 526 until a transmission 521 is made on the same channel that infrastructure node 504 is listening on as shown by line and arrows 806. These transmissions are sent on different channels such that each transmission is on a channel selected from a predefined frequency/channel hopping pattern. There may be spacing 522 in between sequential transmissions from leaf node 503. This may be the region when the infrastructure node 504 may respond with a message 525. In the illustrative example of transmission 521 occurring during DSF 523, there may be a space 522 for infrastructure node 504 to respond with sync information 525 at the same channel. Upon receipt of sync information 525, subsequent transmissions of leaf node 503 may occur aligned with the time slots or subframes of infrastructure node 504. If leaf node 503 did not receive sync information 525 from the infrastructure node 504, the leaf node may continue to transmit beacons 521 at different frequencies from the list of frequencies until it receives the sync information 525 or until it reaches a threshold for transmissions. If it reaches the threshold, the leaf node 503 enters the error state 533 through transition 551.

The transmission 521 by leaf node 503 may also request an allocation 524 of periodic communication from infrastructure node 504. The allocation 524 information may be included with sync information 525 to leaf node 503. Allocation 524 may be for data transmission 809 on another channel. During the DTPs 808, infrastructure node 504 may receive other data messages 811 and 812 in similar allocations 524 but at different channels 526. These channels may be based on the leaf node's frequency/channel hopping pattern, which may be different from the above mentioned pattern. Also during DTPs 808, infrastructure node 504 may be receiving transmissions 813, 814 and 815 (i.e., data 532) from other leaf nodes, respectively, at other allocations and other channels 526. These channels may be based on the individual frequency hopping patterns of the other leaf nodes. Transmissions 813 may be at various channels 526 but they may have the same allocation relative to the respective frames 805. The same is true relative to transmissions 814 and 815 of the other two leaf nodes. The allocations may remain the same for the respective leaf nodes in subsequent DTPs 808. The normal listening frequency of infrastructure node 504 may be different from the previous DTP 808. This may be the DTP frequency in state 703.

Each allocation 524 may be part of an OSF 807. The allocation may be big enough for more than one transmission attempt. For instance, if allocation or time slot 524 is sufficient for two transmissions, then there may be a transmit data message 537, and if it is not successful (i.e., the leaf node did not receive a reply for this message from the infrastructure node), then there may be a re-transmit data message 539 (FIG. 4). If allocation or time slot 524 is sufficient for three transmissions, there may be a transmit data message 537 and a re-transmit data message 539, and if the two are not successful, then there may be a re-transmit data message 542. The acknowledgement from the infrastructure node 504 may include time synchronization information 525 for updating the clock of leaf node 503.

FIGS. 13, 14, 15 and 16 show a timing diagram for a redundant case involving a leaf node 603 and several infrastructure nodes. The leaf node 603 timing is shown in diagram portion 853. First and second infrastructure nodes 604a and 604b timing is shown in diagram portions 851 and 852. There is a number of discovery time periods (DTPs) 858 divided into frames 855. The DTPs from #0 to #4 are spread across the FIGS. 13-16, and each DTP is shown to have 8 frames. The number of frames may be more or less than the illustrated number of frames 855 per DTP 858. Each frame 855 may have a DSF 623 and an OSF 857. There may be a time allocation or interruption 623 at the beginning of each frame in FIGS. 13-16 for listening for a transmission 621 from a leaf node 603. Leaf node 603 may repeatedly send transmissions 621 allowing time 622 (similar to time spacing 522 above) between transmissions 621 for receiving a response. These transmissions are sent on different channels such that each transmission is on a channel selected from a predefined frequency/channel hopping pattern. Transmission 621 may request time sync information 625 which may be in the response from an infrastructure node to the leaf node 603. The leaf node may continuously send beacons 621 until one is heard by an infrastructure node 604. For an illustrative example, beacon or transmission 621 may be received by a first infrastructure node 604a in DSF 623 on a channel 626. Channels 626, as an illustrative example, at various frequencies are delineated by horizontal lines in the respective graph portions 851, 852 and 853. The numerical term "626" may designate one or more different channels. A receipt by an infrastructure node of a transmission 621 requesting time sync information 625 from leaf node 603 and a response with time sync information 625 is shown by line 859. Synch information 625 may be sent on the same channel 626 that the transmission 621 was received on. Interruption or DSF 623 is sufficiently long enough to receive at least one transmission 621. Other time slots or allocations 624 are sufficiently long enough to receive at least one transmission 621.

Each allocation 624 may be part of an OSF 857. The allocation may be big enough for more than one transmission attempt. For instance, if allocation or time slot 624 is sufficient for two transmissions, then there may be a transmit data message 682, and if the latter is not successful, then there may be a re-transmit data message 686 (FIG. 7). If allocation or time slot 624 is sufficient for three transmissions, there may be a transmit data message 682 and a re-transmit data message 686, and if the latter two are not successful, then there may be a re-transmit data message 692.

First and second infrastructure nodes 604a and 604b may listen on different channels relative to each other, but either one may be capable of being first in receiving a beacon transmission 621 from a leaf node 603. When a transmission beacon is received by one of the infrastructure nodes 604, 604a, 604b, . . . 604n, that infrastructure node may send a response with the clock sync information 625 to the leaf node 603. Then leaf node 603 may effectively synchronize its clock with a system clock. In the meanwhile, both infrastructure nodes 604a and 604b may be receiving transmissions 863, 864 and 865 from other leaf nodes 603. These transmissions 863, 864 and 865 may retain the same time allocation 624 but hop or change channels every time they transmit. The channels may be based on the individual frequency hopping patterns of these leaf nodes.

When leaf node 603 has its clock synchronized with the system clock, the leaf node 603 may begin transmitting the RSSI beacons 631 during the DSFs, starting from the beginning of the next DTP, in different channels 626 selected from a pre-defined frequency/channel hopping pattern. Time sync information 625 may include the amount of time till the beginning of the next DTP. This is the amount of time that leaf node 603 should operate in a reduced power consumption mode 656. There may be a minimum spacing 632 between transmissions 631 for receiving a possible response 635. Two beacons or transmissions 631 may be sent within one DSF 623, having a spacing 632 between them for a response 635. An illustrative example is an RSSI exchange 871 between leaf node 603 and the first infrastructure node 604a and an RSSI exchange 872 between leaf node 603 and the second infrastructure node 604b in FIG. 14. Like transmissions 621, transmissions of RSSI beacons 631 are sent out in the DSF slot 623 at different channels 626 at each frame 855 of a DTP 858 in a manner that all channels 626 are used so that each listening infrastructure node channel is eventually used within the DTP. The transmissions 631 may occur during the interruptions DSF 623 for a selected number of interruptions. Each interruption may be sufficiently long enough to receive at least one or two messages 631. When one or more infrastructure nodes 604, 604a, 604b, . . . 604n, receive the transmission 631 during the interruption 623, the respective first and second infrastructure nodes 604a and 604b, respectively, as illustrated by lines 871 and 872, respectively, may send a message 637 containing the link quality information 635 to the leaf node 603 on the same channel 626 as the transmission 631 was received by the respective infrastructure node. The leaf node may compute some link quality information for each of these messages.

Upon receipt of link quality information from the various infrastructure nodes 604, 604a, 604b, . . . 604n, leaf node 603 may combine this received information along with the computed information to prepare a preferred list 873 of infrastructure nodes. The first infrastructure node 604a on the list 873 may be deemed as the best infrastructure node to be informed about the list 873. Along with the link quality information 635 in the message 637, an allocation 634 on a channel 626 from the list of channels 626 may be provided by all the responding infrastructure nodes. The leaf node uses the allocation 634 and the channel 626 sent by the best infrastructure node 604a, which is the first infrastructure node in FIGS. 13-16. A message 641 containing list 873 may be sent by leaf node 603 to the first (best) infrastructure node 604a during the temporary allocation 634. The message 641 sent by leaf node 603 may include a request for a regular time slot allocation 644 and information about the channels that will be used by the leaf node 603 in these regular allocations.

The best infrastructure node 604*a* may communicate with the preferred infrastructure nodes on list 873 to select a regular time slot allocation 644 that is available to two or more of the listed infrastructure nodes. In the DTP 858 (DTP#3), the best infrastructure node 604*a* may send a message 648 indicating the location of the regular allocation 644. This message or transmission 648 may be in response to an inquiry transmission or message 649 from leaf node 603 to the best infrastructure node 604*a*, for information about the regular allocation 644. These messages 649 and 648 may be sent during the temporary allocation 634. Leaf node 603 may operate in a reduced power consumption mode 656 (FIG. 5) when not communicating with the infrastructure nodes.

Leaf node 603 may send a transmission 661 within the regular allocation 644 on the designated channel 626 in the next DTP 858 (DTP#4) to the two or more infrastructure nodes on the list 873 that provided the allocation 644. Transmission 661 may contain data or other information. Transmission 661 may be sent on a different channel 626 at allocation 644 during each frame 855 of DTP 858, as is shown for the first three frames of last DTP 858 (DTP#4) to the right of FIG. 16. Each of the infrastructure nodes on the list 873 may send a reply 651 to the leaf node 603, upon receipt of transmission or message 661 from that leaf node 603, within the same allocation 644, on the same channel 626 and frame 855. The reply may include time synchronization information 625 for updating the clock of leaf node 603. The channel 626 may change for each allocation 644 from frame to frame 855 for communications 661 and 651. Illustrative examples of channel 626 change may include pseudo random selections, frequency hopping patterns, direct sequence speed spectrum channel code values, and other approaches for channel 626 determinations.

A wireless system 501 of FIG. 1*a* may have one or more leaf nodes (i.e., LNode or initiating device) 503 and an infrastructure node (i.e., INode or responding device) 504. The infrastructure node 504 periodically or occasionally may have an interruption (DSF) 523 in its normal operation 512 to listen for a transmission 521 from a new leaf node 503. The leaf node 503 may repeatedly send a transmission 521 of tightly packed messages requesting time synchronization information 525 with minimum spacing allowing time 522 between transmissions 521 for receiving a response 525. The infrastructure node 504 may receive the transmission 521 from the leaf node 503 during a DSF interruption 523 or OSF 807. The infrastructure node 504 may send time synchronization information 525 to the leaf node 503 immediately following a reception of the transmission 521 from the leaf node 503.

The leaf node 503 and infrastructure node 504 may communicate on more than one channel 526 selected from a list of channels. Each interruption 523 of the infrastructure node 504 may be sufficiently long to receive a transmission 521 of at least one message requesting time synchronization information 525. The infrastructure node 504 may remain on the same channel 526 during the interruptions 523 for a selected number of interruptions for receiving a transmission 521 from the leaf node 503.

The leaf node 503 may transmit a message 521 requesting time synchronization information 525 on all channels 526 that are used by the infrastructure node 504, during a plurality of interruptions 523 within the selected number of interruptions. The infrastructure node 504 may receive the message 521 requesting time synchronization information 525. The infrastructure node 504 may transmit time synchronization information 525 to the leaf node 503 on the same channel 526 that the transmission 521 from the leaf node 503 was received by the infrastructure node 504.

The transmission 521 sent by the leaf node 503 may include a request for an allocation 524 of periodic communication time from the infrastructure node 504. The infrastructure node 504 may send at least one allocation 524 of periodic communication time from an available budget of time. The allocation 524 of periodic communication time may be included with the time synchronization information 525 sent by the infrastructure node 504 to the leaf node 503. The leaf node 503 may send one or more transmissions such as those of 809, 811 and 812 within a time slot of an allocation 524 of periodic communication time.

The leaf node 503 may operate in a reduced power consumption mode 531 when not communicating with the infrastructure node 504. The infrastructure node 504 may receive a transmission 521 on a channel 526 from the list of channels. The leaf node 503 may provide, in a message 521 requesting time synchronization information 525, sufficient information to allow the infrastructure node 504 to be aware of the channel 526 for use by the leaf node 503 in future transmissions.

In normal operation, the infrastructure node 504 may send a reply 525 to the leaf node 503 within the allocation 524 of periodic communication time in response to a transmission such as for example 809, 811 and/or 812 received from the leaf node 503. The reply 525 to the leaf node 503 may include the time synchronization information. A channel 526 to be used by the leaf node 503 may change for each allocation 524 of periodic communication time. The channel 526 may be pseudo randomly selected, determined by a frequency hopping pattern, or determined by a direct sequence spread spectrum channel code value.

The interruption 523 may be sufficiently long to receive a transmission 521 of at least two successive messages requesting time synchronization information 525. The leaf node 503 may repeatedly send the transmission 521 of tightly packed messages requesting time synchronization information 525 on channels 526 selected from a series of sequences of channels, for a period of time during and in between a number of interruptions 523 equal to or greater than the selected number of interruptions. Each sequence of channels 526 may contain all channels from the list of channels in a different permutation. A message 521 requesting time synchronization information 525 may be transmitted on each channel 526 from the sequence of channels. Each sequence of channels 526 from the series of sequences of channels may be used for transmissions 521 of the message requesting time synchronization information 525 such that the message requesting time synchronization information 525 is transmitted on all channels 526 from the list of channels during the selected number of interruptions 523. For example, consider an illustrative list of 10 channels and assume that the interruptions can accommodate one message requesting time synchronization information and the time between interruptions can accommodate 10 messages. Then a series of sequence of channels can be used for transmission of the messages. If each sequence of channels is a circular permutation of the previous sequence offset by one channel (i.e. if sequence #1 is defined as channels {1, 2, . . . , 10} then sequence #2 will be defined as channels {2, 3, . . . , 10, 1}). A series of 10 such sequences will ensure that messages are transmitted on all 10 channels during the interruptions and thereby ensure reception of the message by an infrastructure node 504 in the transmission range of the leaf node 503.

A wireless system 601 of FIG. 1*b* may have at least one leaf node 603 and at least two infrastructure nodes of a group of nodes 604, 604a, 604b, . . . 604n. Each infrastructure node may periodically or occasionally have an interruption 623 in its normal operation to listen for a transmission 621 from a leaf node 603. Each infrastructure node may be synchronized to a system clock. A leaf node 603 may repeatedly send a transmission 621 of tightly packed messages requesting time synchronization information 625 with minimum spacing, allowing time 622 between transmissions 621 for receiving a response with sync information 625. One or more infrastructure nodes may receive the transmission 621 from the leaf node 603 during an interruption 623. An infrastructure node that first receives a transmission 621 from the leaf node 603 during an interruption 623 may send time synchronization information 625 to the leaf node 603.

The leaf and infrastructure nodes 603 and 604 may communicate on more than one channel 626 selected from a list of channels. The interruption 623 may be sufficiently long to receive a transmission 621 of at least one message requesting time synchronization information 625. Each infrastructure node may remain on the same channel 626 during the interruptions 623 for a selected number of interruptions for receiving a transmission from the leaf node 603. The selected number of interruptions at the same frequency may be for one DTP 858.

The leaf node 603 may send a transmission 621 of messages requesting time synchronization information 625 on all channels 626 that are used by the infrastructure nodes, during a plurality of interruptions 623 within the selected number of interruptions. An infrastructure node may receive the transmission of messages requesting time synchronization information 625. The infrastructure node that receives the transmission 621 from the leaf node 603 may transmit time synchronization information 625 to the leaf node 603 on the same channel 626 that the transmission 621 from the leaf node 603 was received by the infrastructure node. The leaf node 603, after receiving time synchronization information 625, may operate in a reduced power consumption mode or idle/sleep state 656 for a certain amount of time. The time synchronization information 625 may include the amount of time that the leaf node 603 should operate in a reduced power consumption mode 656 (FIG. 5).

Figure 13:
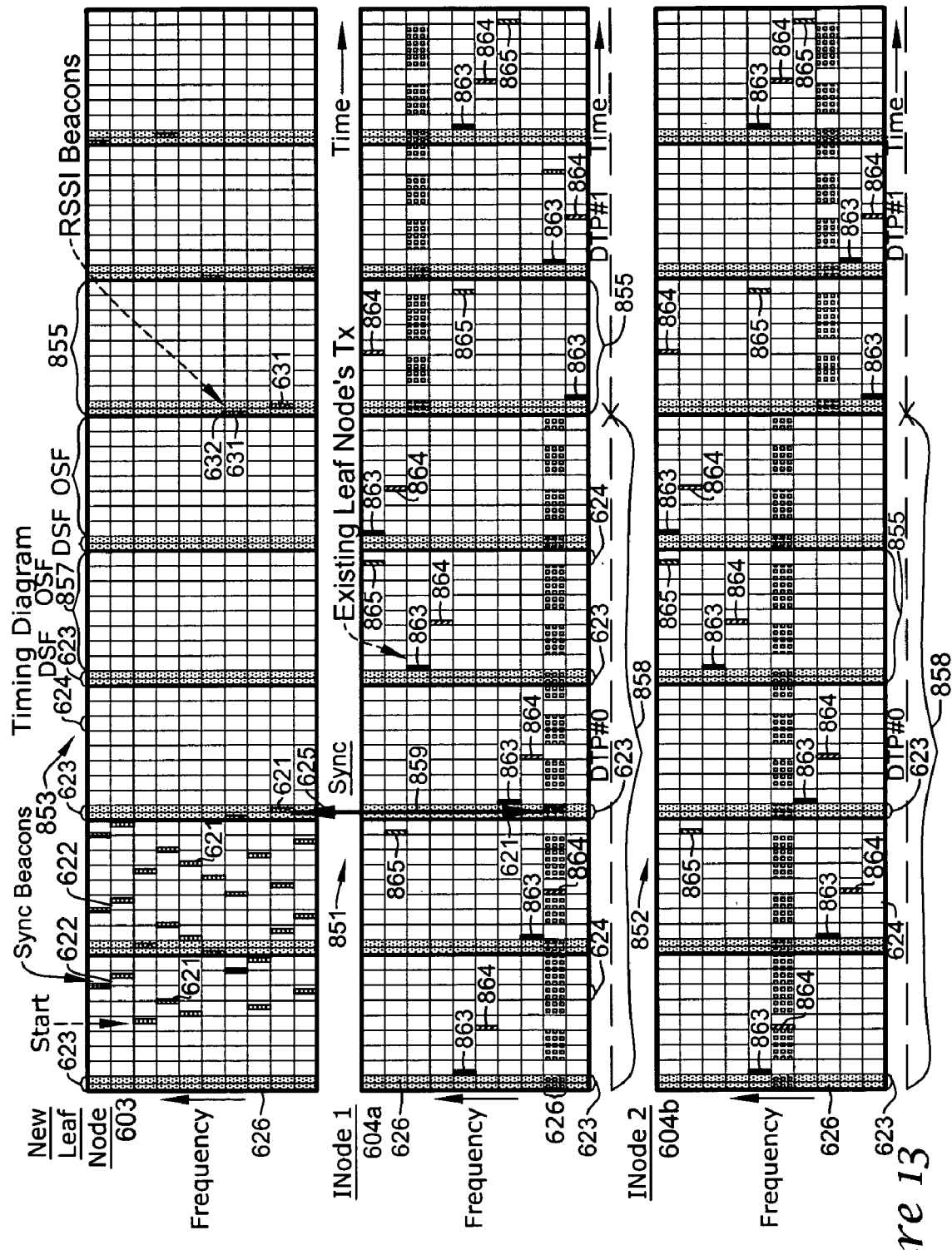
FIGS. 13-16 are timing diagrams of a redundant wireless system.
Figure 14:
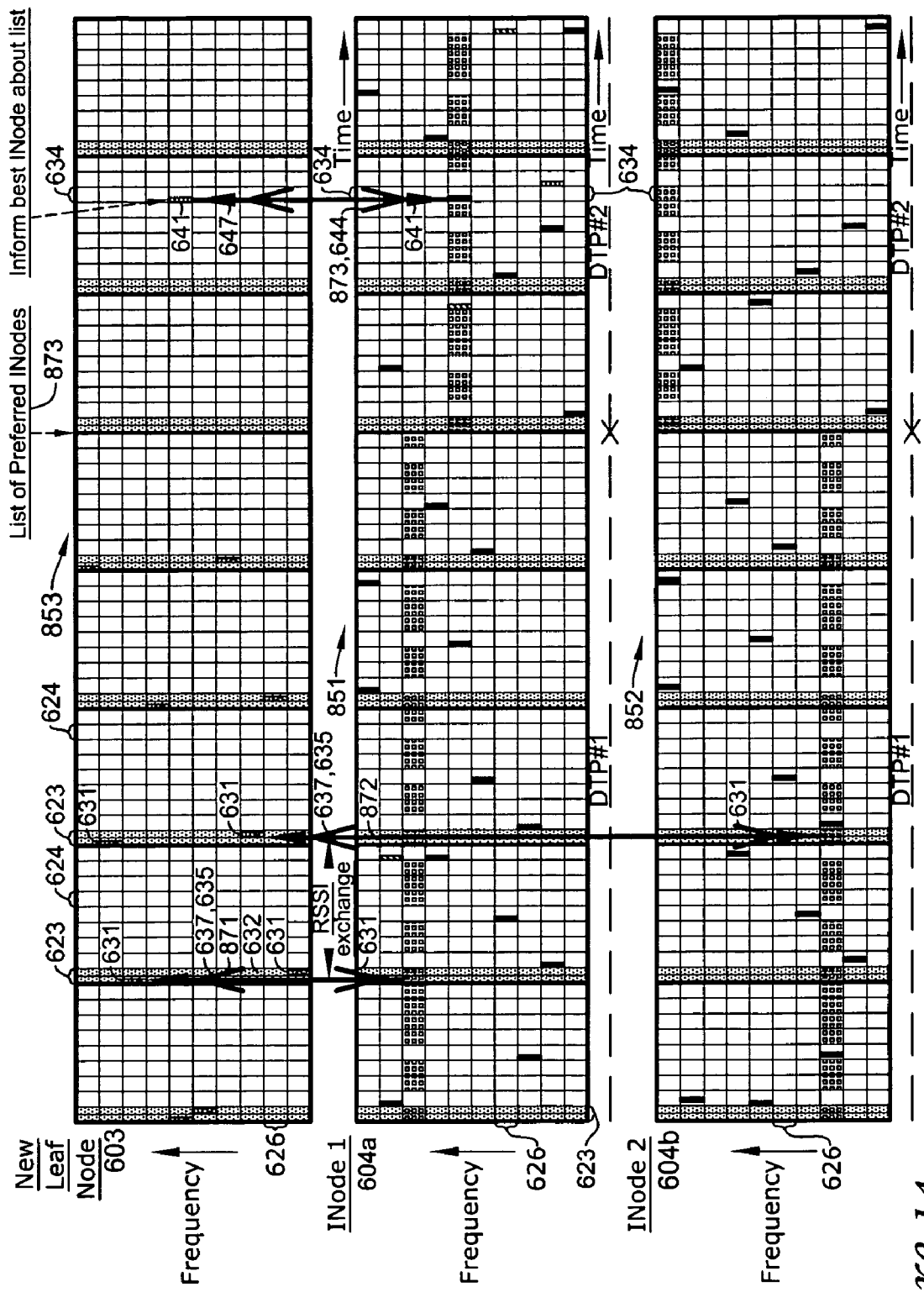
Figure 15:
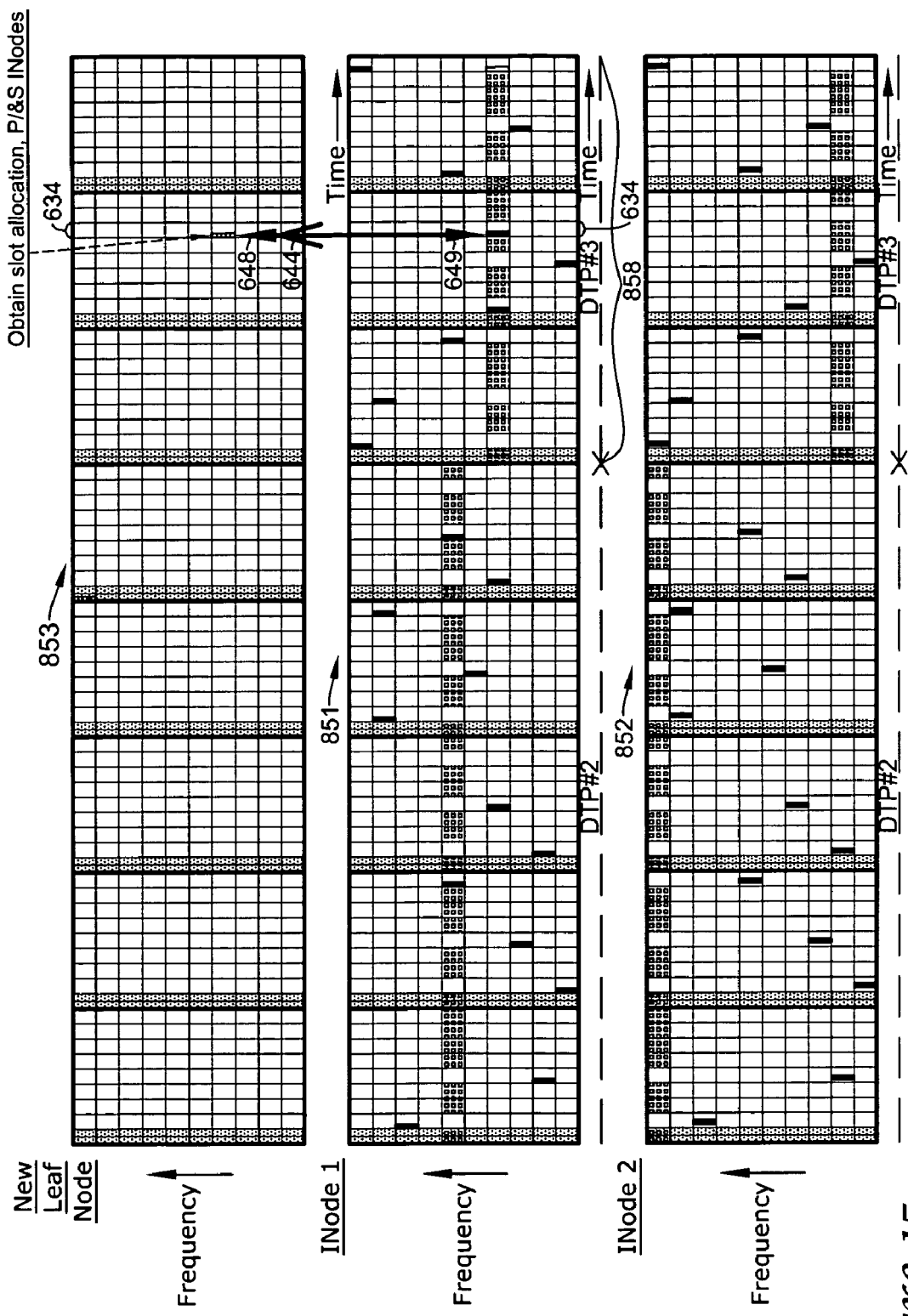

Relative to FIG. 13, the interruption 623 may be sufficiently long to receive a transmission of at least two successive messages requesting time synchronization information 625. That interruption may be adjusted according to design and/or need. The leaf node 603 may repeatedly send the transmission 621 of tightly packed messages requesting time synchronization information 625 on channels 626 selected from a series of sequences of channels, for a period of time during and in between a number of interruptions 625 equal to or greater than the selected number of interruptions. Each sequence of channels 626 may contain all channels from the list of channels in a different permutation. A message 621 requesting time synchronization information may be transmitted on each channel 626 from the sequence of channels. Each sequence of channels 626 from the series of sequences of channels may be used for transmissions 621 of the message requesting time synchronization information such that the message requesting time synchronization information is transmitted on all channels 626 from the list of channels during the selected number of interruptions 623. For example, consider an illustrative list of 10 channels and assume that the interruptions can accommodate one message requesting time synchronization information and the time between interruptions can accommodate 10 messages. Then a series of sequence of channels can be used for transmission of the messages. If each sequence of channels is a circular permutation of the previous sequence offset by one channel (i.e., if sequence #1 is defined as channels {1, 2, . . . , 10} then sequence #2 will be defined as channels {2, 3, . . . , 10, 1}). A series of 10 such sequences will ensure that messages are transmitted on all 10 channels during the interruptions and thereby ensure reception of the message by an infrastructure node in the transmission range of the leaf node 603.

The leaf node 603 may repeatedly send a transmission 631 of tightly packed messages requesting link quality information 635 with minimum spacing 632 allowing time between transmissions 631 for receiving a response 635, after operating in the reduced power consumption mode for the amount of time. The leaf node 603 may send the transmission 631 of messages requesting link quality information 635 on all channels 626 that are used by the infrastructure nodes. The transmissions 631 may occur during the interruptions 623 for a selected number of interruptions.

Each interruption 623 may be sufficiently long to receive a transmission of at least one message 631 requesting link quality information 635. One or more infrastructure nodes of the group of nodes 604, 604a, 604b, . . . 604n, may receive the transmission 631 from the leaf node 603 during an interruption 623. Each infrastructure node that receives the transmission 631 from the leaf node 603 may send a message 637 containing link quality information 635 to the leaf node 603 on the same channel 626 that the transmission from the leaf node 603 was received by the infrastructure node. Each infrastructure node may provide in the message 637 containing link quality information 635, a temporary allocation 634 of communication time from an available budget of time during its normal operation and a channel 626 from the list of channels.

The leaf node 603 may receive the message 637 containing link quality information 635 from each infrastructure node that receives the transmission 631 from the leaf node 603. The leaf node 603 may add the message 637 from each infrastructure node to a list of messages. The leaf node may compute some link quality information for each of these messages.

The leaf node 603 may stop the transmission 631 of messages requesting link quality information 635 when a number of messages in the list of messages exceeds a selected number of messages. On the other hand, the leaf node 603 may stop the transmission 631 of messages requesting link quality information 635 after a selected amount of time. The time synchronization information 625 may include the selected amount of time that the leaf node 603 repeatedly sends a transmission 631 for messages 637 requesting link quality information 635.

The leaf node 603 may prepare a list 873 of preferred infrastructure nodes from the list of messages of link quality information 635. The leaf node 603 may combine the received link quality information along with the computed information to prepare this list. The list of preferred infrastructure nodes may be sorted in descending order of preference according to link quality. The leaf node 603 may select the first entry in the list of preferred infrastructure nodes as a best infrastructure node 604a. The leaf node 603 may operate in a reduced power consumption mode 656 until the start of the temporary allocation 634 of communication time provided by the best infrastructure node 604a, e.g., the first infrastructure node 604a in FIGS. 13-16. The leaf node 603 may transmit a message 641 containing the list 873 of preferred infrastructure nodes to the best infrastructure node 604a during the temporary allocation 634 of communication time and on the channel 626 from the list of channels 626 provided by the best infrastructure node 604.

The message 641 transmitted by the leaf node 603 may include a request for a regular allocation 644 of periodic communication time from the best infrastructure node 604*a*. The message 641 transmitted by the leaf node 603 may contain sufficient information about the channel 626 that will be used by the leaf node 603 for future transmissions in the regular allocation 644.

The best infrastructure node 604*a* may send an acknowledgement 647 to the leaf node 603 after receiving the message 641 containing the list 873 of preferred infrastructure nodes. The acknowledgement 647 may include an updated temporary allocation 634 of communication time and an updated channel 626 from the list 873 of channels.

The best infrastructure node 604*a* may communicate with the infrastructure nodes in the list 873 of preferred infrastructure nodes and select an allocation 644 of periodic communication time for the leaf node 603 that is common to the available budgets of time of two or more infrastructure nodes and an order of preference of the two or more infrastructure nodes in the list of preferred infrastructure nodes.

The best infrastructure node 604*a* may communicate the list of preferred infrastructure nodes to a central time allocation entity. The central time allocation entity may select an allocation 644 of periodic communication time that is common to the available budgets of time of two or more infrastructure nodes in the list of preferred infrastructure nodes 604. The central time allocation entity, which might be the best infrastructure node 604*a*, may send information about the allocation 644 of periodic communication time for the leaf node 603 and an order of preference of the two or more infrastructure nodes to the best infrastructure node 604*a*.

The best infrastructure node 604*a* may send a message 648 containing the information about the allocation 644 of periodic communication time and the order of preference of the two or more infrastructure nodes to the leaf node 603, and the order of preference of the two or more infrastructure nodes to the two or more infrastructure nodes. The message 648 may also include sufficient information about the channel 626 for use by the leaf node 603 in future transmissions.

The leaf node 603 may transmit an inquiry message 649 to the best infrastructure node 604*a* on the updated channel 626 from the list of channels 626 during the updated temporary allocation 634 of communication time. The best infrastructure node 604*a*, after receiving the inquiry message 649, may send the information about the allocation 644 of periodic communication time and the order of preference of the two or more infrastructure nodes to the leaf node 603 on the updated channel 626.

The leaf node 603 may send one or more transmissions 661 within a time slot of an allocation 644 of periodic communication time. The two or more infrastructure nodes may receive the one or more transmissions on a channel 626 from the list of channels. The leaf node 603 may operate in a reduced power consumption mode when not communicating with the two or more infrastructure nodes.

Each of the two or more infrastructure nodes may send a reply 651 to the leaf node 603, in the order of preference of the two or more infrastructure nodes, within the allocation 644 of periodic communication time in response to a transmission 661 received from the leaf node 603. The reply 651 from each of the two or more infrastructure nodes to the leaf node 603 may include time synchronization information 625. This information 625 may be used by the leaf node 603 to update/correct its clock. A channel 626 to be used by the leaf node 603 may change for each allocation 644 of periodic communication time. The channel 626 may be pseudo randomly selected, determined by a frequency hopping pattern, and determined by a direct sequence spread spectrum channel code value.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A wireless system comprising:
   at least one initiating device;
   a responding device;
   wherein the wireless system is configured to perform wireless communication in which:
   the initiating and responding devices may communicate on more than one channel selected from a list of channels;
   the responding device intermittently has an interruption in its normal operation to listen for a transmission from an initiating device, each interruption of the responding device is sufficiently long to receive a transmission of at least one message requesting time synchronization information;
   the initiating device repeatedly sends a transmission of messages on each of two or more channels requesting time synchronization information of the responding device allowing time between transmissions for receiving a response from the responding device;
   the responding device receives the transmission from the initiating device during an interruption, the responding device remains on the same channel during the interruptions for a selected number of interruptions for receiving a transmission from the initiating device;
   the initiating device repeatedly sends the transmission messages requesting time synchronization information on channels selected from a series of sequences of channels, for a period of time during and in between a number of interruptions equal to or greater than the selected number of interruptions;
   each sequence of channels contains all channels from the list of channels in a different permutation;
   a message requesting time synchronization information is transmitted on each channel from the sequence of channels;
   each sequence of channels from the series of sequences of channels is used for transmissions of the message requesting time synchronization information such that the message requesting time synchronization information is transmitted on all channels from the list of channels during the selected number of interruptions; and
   the responding device sends time synchronization information of the responding device to the initiating device following a reception of the transmission from the initiating device.

2. The system of claim 1, wherein:
   the initiating device transmits a message requesting time synchronization information on all channels that are used by the responding device during a plurality of interruptions within the selected number of interruptions; and
   the responding device receives the message requesting time synchronization information.

3. The system of claim 2, wherein the responding device transmits time synchronization information to the initiating device on the same channel that the transmission from the initiating device was received by the responding device.

4. The system of claim 3, wherein the transmission sent by the initiating device includes a request for an allocation of periodic communication time from the responding device.

5. The system of claim 3, wherein the responding device sends at least one allocation of periodic communication time from an available budget of time.

6. The system of claim 5, wherein the allocation of periodic communication time is included with the time synchronization information sent by the responding device to the initiating device.

7. The system of claim 5, wherein the initiating device may send one or more transmissions within a time slot of an allocation of periodic communication time.

8. The system of claim 7, wherein the one or more transmissions may comprise at least one re-transmission.

9. The system in claim 7, wherein the initiating device operates in a reduced power consumption mode when not communicating with the responding device.

10. The system of claim 7, wherein the responding device receives a transmission on a channel from the list of channels.

11. The system of claim 10, wherein the initiating device provides, in a message requesting time synchronization information, sufficient information to allow the responding device to be aware of the channel for use by the initiating device in future transmissions.

12. The system of claim 11, wherein the responding device sends a reply to the initiating device within the allocation of periodic communication time in response to a transmission received from the initiating device.

13. The system of claim 12, wherein the reply to the initiating device includes the time synchronization information.

14. The system of claim 10, wherein a channel to be used by the initiating device changes for each allocation of periodic communication time.

15. The system of claim 10, wherein a channel to be used by the initiating device changes for each transmission within each allocation of periodic communication time.

16. The system of claim 14, wherein the channel is pseudo randomly selected.

17. The system of claim 14, wherein the channel is determined by a frequency hopping pattern.

18. The system of claim 14, wherein the channel is determined by a direct sequence spread spectrum channel code value.

19. The system of claim 3, wherein the interruption is sufficiently long to receive a transmission of at least two successive messages requesting time synchronization information.

20. A wireless system comprising:
at least one initiating device;
at least two responding devices;
wherein the wireless system is configured to perform wireless communication in which:
the initiating and responding devices may communicate on more than one channel selected from a list of channels;
each responding device intermittently has an interruption in its normal operation to listen for a transmission from an initiating device, the interruption is sufficiently long to receive a transmission of at least one message requesting time synchronization information, the responding device remains on the same channel during the interruptions for a selected number of interruptions for receiving a transmission from the initiating device;
each responding device is synchronized to a system clock;
an initiating device repeatedly sends a transmission of messages on each of two or more channels requesting time synchronization information of the responding device until a response is received, allowing time between transmissions for receiving the response;
the initiating device repeatedly sends the transmission of messages requesting time synchronization information on channels selected from a series of sequences of channels, for a period of time during and in between a number of interruptions equal to or greater than the selected number of interruptions;
each sequence of channels contains all channels from the list of channels in a different permutation;
a message requesting time synchronization information is transmitted on each channel from the sequence of channels;
each sequence of channels from the series of sequences of channels is used for transmissions of the message requesting time synchronization information such that the message requesting time synchronization information is transmitted on all channels from the list of channels during the selected number of interruptions;
one or more responding devices receive the transmission from the initiating device during an interruption; and
a responding device that first receives a transmission from the initiating device during an interruption sends time synchronization information of the responding device to the initiating device.

21. The system of claim 20, wherein:
the initiating device sends a transmission of messages requesting time synchronization information on all channels that are used by the responding devices, during a plurality of interruptions within the selected number of interruptions; and
a responding device receives the transmission of messages requesting time synchronization information.

22. The system of claim 21, wherein the responding device that receives the transmission from the initiating device, transmits time synchronization information to the initiating device on the same channel that the transmission from the initiating device was received by the responding device.

23. The system of claim 22, wherein the initiating device, after receiving time synchronization information, operates in a reduced power consumption mode for an amount of time.

24. The system of claim 23, wherein the time synchronization information includes the amount of time that the initiating device should operate in a reduced power consumption mode.

25. The system of claim 23, wherein the initiating device repeatedly sends a transmission of messages requesting link quality information allowing time between transmissions for receiving a response, after operating in the reduced power consumption mode for the amount of time.

26. The system of claim 25, wherein the initiating device sends the transmission of messages requesting link quality information on all channels that are used by the responding devices.

27. The system of claim 26, wherein the transmissions occur during the interruptions for a selected number of interruptions.

28. The system of claim 26, wherein:
each interruption is sufficiently long to receive a transmission of at least one message requesting link quality information;
one or more responding devices may receive the transmission from the initiating device during an interruption;
each responding device that receives the transmission from the initiating device sends a message containing link quality information to the initiating device on the same channel that the transmission from the initiating device was received by the responding device; and each responding device provides in the message containing link quality information, a temporary allocation of communication time from an available budget of time during its normal operation and a channel from the list of channels.

29. The system of claim 28, wherein:
the initiating device receives the message containing link quality information from each responding device that receives the transmission from the initiating device; and
the initiating device adds the message from each responding device to a list of messages.

30. The system of claim 29, wherein the initiating device stops the transmission of messages requesting link quality information when a number of messages in the list of messages exceeds a selected number of messages.

31. The system of claim 29, wherein the initiating device stops the transmission of messages requesting link quality information after a selected amount of time.

32. The system of claim 31, wherein the time synchronization information includes the selected amount of time that the initiating device repeatedly sends a transmission of messages requesting link quality information.

33. The system of claim 31, wherein:
the initiating device prepares a list of preferred responding devices from the list of messages;
the list of preferred responding devices is sorted in descending order of preference; and
the initiating device selects the first entry in the list of preferred responding devices as a best responding device.

34. The system of claim 33, wherein the initiating device operates in a reduced power consumption mode until the start of the temporary allocation of communication time provided by the best responding device.

35. The system of claim 33, wherein the initiating device transmits a message containing the list of preferred responding devices to the best responding device during the temporary allocation of communication time and on the channel from the list of channels provided by the best responding device.

36. The system of claim 35, wherein the message transmitted by the initiating device includes a request for an allocation of periodic communication time from the best responding device.

37. The system of claim 35, wherein the message transmitted by the initiating device contains sufficient information about the channel for use by the initiating device in future transmissions during its allocation of periodic communication time.

38. The system of claim 37, wherein the best responding device sends an acknowledgement to the initiating device after receiving the message containing the list of preferred responding devices.

39. The system of claim 38, wherein the acknowledgement includes an updated temporary allocation of communication time and an updated channel from the list of channels for use by the initiating device.

40. The system of claim 39, wherein the best responding device communicates with the responding devices in the list of preferred responding devices and selects an allocation of periodic communication time for the initiating device that is common to the available budgets of time of two or more responding devices and selects an order of preference of the two or more responding devices in the list of preferred responding devices.

41. The system of claim 39, wherein:
the best responding device communicates the list of preferred responding devices to a central time allocation entity;
the central time allocation entity selects an allocation of periodic communication time that is common to the available budgets of time of two or more responding devices in the list of preferred responding devices;
the central time allocation entity sends information about the allocation of periodic communication time for the initiating device and an order of preference of the two or more responding devices to the best responding device;
the best responding device sends a message containing the information about the allocation of periodic communication time for the initiating device and the order of preference of the two or more responding devices to the two or more responding devices; and
the message also includes sufficient information about the channel for use by the initiating device in future transmissions.

42. The system of claim 39, wherein:
the best responding device communicates the list of preferred responding devices and sufficient information about the channel for use by the initiating device in future transmissions to a central time allocation entity;
the central time allocation entity selects an allocation of periodic communication time that is common to the available budgets of time of two or more responding devices in the list of preferred responding devices;
the central time allocation entity sends information about the allocation of periodic communication time for the initiating device and an order of preference of the two or more responding devices to the best responding device and to the two or more responding devices; and
the central time allocation entity sends sufficient information about the channel for use by the initiating device in future transmissions to the two or more responding devices.

43. The system of claim 42, wherein the initiating device transmits an inquiry message to the best responding device on the updated channel from the list of channels during the updated temporary allocation of communication time.

44. The system of claim 43, wherein the best responding device, after receiving the inquiry message, sends the information about the allocation of periodic communication time and the order of preference of the two or more responding devices to the initiating device on the updated channel.

45. The system of claim 44, wherein:
the initiating device may send one or more transmissions within a time slot of an allocation of periodic communication time; and
the two or more responding devices receive the one or more transmissions on a channel from the list of channels.

46. The system of 45, wherein the one or more transmissions may comprise at least one re-transmission.

47. The system of claim 45, wherein the initiating device operates in a reduced power consumption mode when not communicating with the two or more responding devices.

48. The system of claim 45, wherein each of the two or more responding devices send a reply to the initiating device, in the order of preference of the two or more responding devices, within the allocation of periodic communication time in response to a transmission received from the initiating device.

49. The system of claim 48, wherein the reply from each of the two or more responding devices to the initiating device includes time synchronization information.

50. The system of claim 37, wherein a channel to be used by the initiating device changes for each allocation of periodic communication time.

51. The system of claim 37, wherein a channel to be used by the initiating device changes for each transmission within each allocation of periodic communication time.

52. The system of claim 50, wherein the channel is pseudo randomly selected.

53. The system of claim 50, wherein the channel is determined by a frequency hopping pattern.

54. The system of claim 50, wherein the channel is determined by a direct sequence spread spectrum channel code value.

55. The system of claim 22, wherein the interruption is sufficiently long to receive a transmission of at least two successive messages requesting time synchronization information.

56. A wireless system comprising:
at least one initiating device;
a responding device;
wherein the wireless system is configured to perform wireless communication in which:
the at least one initiating device and responding device can communicate on more than one channel selected from a list of channels;
the at least one initiating device is time synchronized with the responding device;
the responding device has a normal operation of communicating with the at least one initiating device;
the at least one initiating device sends a message to the responding device within a designated time; and
the responding device intermittently has an interruption in its normal operation to carry out other activities; including listening for a message requesting time synchronization information of the responding device from an initiating device not time synchronized with the responding device;
the responding device remains on the same channel during the interruptions for a selected number of interruptions for receiving a transmission from the at least one initiating device;
the initiating device not time synchronized with the responding device repeatedly sends messages requesting time synchronization information on channels selected from a series of sequences of channels;
each sequence of channels contains all channels from the list of channels in a different permutation;
a message requesting time synchronization information is transmitted on each channel from the sequence of channels; and
each sequence of channels from the series of sequences of channels is used for transmissions of the message requesting time synchronization information such that the message requesting time synchronization information is transmitted on all channels from the list of channels during the selected number of interruptions.

57. The system of claim 56, wherein the initiating device operates in a reduced power consumption mode when not communicating with the responding device.

58. The system of claim 56, wherein the designated time is a time slot of an allocation of periodic communication time.

59. The system of claim 58, wherein the initiating device may send one or more transmissions within the designated time.

60. The system of claim 59, wherein the responding device receives a transmission from the initiating device on a channel from the list of channels during the designated time.

61. The system of claim 60, wherein the initiating device provides sufficient information to allow the responding device to be aware of the channel for use by the initiating device in future transmissions.

62. The system of claim 60, wherein the responding device provides sufficient information to allow the initiating device to be aware of the channel for use in future transmissions.

63. The system of claim 60, wherein the responding device sends a reply to the initiating device within the designated time in response to a transmission received from the initiating device.

64. The system of claim 63, wherein the one or more transmissions sent by the initiating device may comprise at least one re-transmission.

65. The system of claim 64, wherein the reply to the initiating device includes the time synchronization information.

66. The system of claim 60, wherein a channel to be used by the initiating device changes for each allocation of periodic communication time.

67. The system of claim 60, wherein a channel to be used by the initiating device changes for each transmission within each allocation of periodic communication time.

68. The system of claim 66, wherein the channel is pseudo randomly selected.

69. The system of claim 66, wherein the channel is determined by a frequency hopping pattern.

70. The system of claim 66, wherein the channel is determined by a direct sequence spread spectrum channel code value.

71. A wireless system comprising:
at least one initiating device;
at least two responding devices;
wherein the wireless system is configured to perform wireless communication in which:
the at least one initiating device and the at least two responding devices can communicate on more than one channel selected from a list of channels;
the two or more responding devices have a normal operation of communicating with an initiating device;
the responding devices are synchronized to a system clock;
the at least one initiating device is time synchronized with the at least two responding devices;
the initiating device sends a message to the responding devices within a designated time;
the responding devices each intermittently have an interruption in their normal operation to carry out other activities including listening for a message requesting time synchronization information of the responding device from an initiating device not time synchronized with the responding devices
each of the responding devices remain on the same channel during the interruptions for a selected number of interruptions for receiving a transmission from the at least one initiating device;
the initiating device not time synchronized with the responding device repeatedly sends messages requesting time synchronization information on channels selected from a series of sequences of channels;
each sequence of channels contains all channels from the list of channels in a different permutation;
a message requesting time synchronization information is transmitted on each channel from the sequence of channels; and
each sequence of channels from the series of sequences of channels is used for transmissions of the message requesting time synchronization information such that the message requesting time synchronization information is transmitted on all channels from the list of channels during the selected number of interruptions.

72. The system in claim 71, wherein the initiating device operates in a reduced power consumption mode when not communicating with the responding devices.

73. The system of claim 71, wherein the designated time is a time slot of an allocation periodic communication time.

74. The system of claim 73, wherein the initiating device may send one or more transmissions within the designated time.

75. The system of claim 74, wherein a responding device receives a transmission from the initiating device on a channel from the list of channels during the designated time.

76. The system of claim 75, wherein the initiating device provides sufficient information to allow the responding devices to be aware of the channel for use by the initiating device in future transmissions.

77. The system of claim 75, wherein the responding devices provides sufficient information to allow the initiating device to be aware of the channel for use in future transmissions.

78. The system of claim 75, wherein the responding devices may send replies to the initiating device within the designated time in response to a transmission received from the initiating device.

79. The system of claim 78, wherein only one of the responding devices sends the reply.

80. The system of claim 78, wherein the responding devices sequentially send replies to the initiating device.

81. The system of claim 78, wherein the one or more transmissions sent by the initiating device may comprise at least one re-transmission.

82. The system of claim 78, wherein the reply to the initiating device includes the time synchronization information.

83. The system of claim 78, wherein a channel to be used by the initiating device changes for each allocation of periodic communication time.

84. The system of claim 75, wherein a channel to be used by the initiating device changes for each transmission within each allocation of periodic communication time.

85. The system of claim 83, wherein the channel is pseudo randomly selected.

86. The system of claim 83, wherein the channel is determined by a frequency hopping pattern.

87. The system of claim 83, wherein the channel is determined by a direct sequence spread spectrum channel code value.

* * * * *